United States Patent
He et al.

(10) Patent No.: US 9,898,037 B2
(45) Date of Patent: Feb. 20, 2018

(54) ELECTRONIC DEVICE AND DISPLAY METHOD

(71) Applicants: Beijing Lenovo Software, Ltd., Haidian District, Beijing (CN); Lenovo (Beijing) Co., Ltd., Haidian District, Beijing (CN)

(72) Inventors: Zhiqiang He, Beijing (CN); Junfeng Liu, Beijing (CN); Weidong Wei, Beijing (CN)

(73) Assignees: BEIJING LENOVO SOFTWARE LTD., Haidian District, Beijing (CN); LENOVO (BEIJING) CO., LTD., Haidian District, Beijing (CN)

(*) Notice: Subject to any disclaimer, the term of this patent is extended or adjusted under 35 U.S.C. 154(b) by 337 days.

(21) Appl. No.: 14/230,629

(22) Filed: Mar. 31, 2014

(65) Prior Publication Data

US 2015/0049066 A1     Feb. 19, 2015

(30) Foreign Application Priority Data

Aug. 13, 2013 (CN) .......................... 2013 1 0351409
Sep. 16, 2013 (CN) .......................... 2013 1 0421847
Jan. 2, 2014 (CN) .......................... 2014 1 0001174

(51) Int. Cl.
*G09G 5/00* (2006.01)
*G06F 1/16* (2006.01)
(Continued)

(52) U.S. Cl.
CPC ............ *G06F 1/16* (2013.01); *G02B 27/0172* (2013.01); *G06F 3/1423* (2013.01); *G02B 17/086* (2013.01); *G09G 2380/02* (2013.01)

(58) Field of Classification Search
None
See application file for complete search history.

(56) References Cited

U.S. PATENT DOCUMENTS 5,506,705 A     4/1996 Yamamoto
5,991,084 A *  11/1999 Hildebrand ........ G02B 27/0101
                                                          359/629
(Continued)

FOREIGN PATENT DOCUMENTS

CN     1115452         1/1996
CN     1324030 A      11/2001
(Continued)

OTHER PUBLICATIONS

First Office Action dated May 23, 2016 out of Chinese priority Application No. 201310421847.2 (21 pages including English translation).

(Continued)

*Primary Examiner* — Ifedayo Iluyomade
(74) *Attorney, Agent, or Firm* — Brinks Gilson & Lione; G. Peter Nichols

(57) ABSTRACT

An electronic device and a display method includes a main body apparatus with a processing unit that generates a first image and performs display control; a fixing apparatus connected with the main body apparatus, which maintains a relative location relationship between the electronic device and at least a part of body of a user; and a first display unit arranged on the main body apparatus and/or the fixing apparatus, which outputs the first image; wherein the first display unit comprises a first display component which displays the first image, and a first optical component which receives light corresponding to the first image emitted from the first display component, and changes the light path of the light corresponding to the first image to form a magnified virtual image corresponding to the first image.

17 Claims, 30 Drawing Sheets

(51) Int. Cl.
*G06F 3/14* (2006.01)
*G02B 27/01* (2006.01)
*G02B 17/08* (2006.01)

(56) References Cited

U.S. PATENT DOCUMENTS

| | | | |
|---|---|---|---|
| 6,158,884 | A | 12/2000 | Lebby |
| 8,186,889 | B2 | 5/2012 | Masuda |
| 8,279,716 | B1 | 10/2012 | Gossweiler |
| 8,379,488 | B1 | 2/2013 | Gossweiler |
| 8,902,714 | B2 | 12/2014 | Gossweiler |
| 2001/0043514 | A1 | 11/2001 | Kita |
| 2002/0135615 | A1* | 9/2002 | Lang ................ G04G 21/00 715/764 |
| 2003/0210467 | A1 | 11/2003 | Song |
| 2006/0146013 | A1 | 7/2006 | Arneson |
| 2007/0177239 | A1 | 8/2007 | Tanijiri |
| 2008/0151379 | A1 | 6/2008 | Amitai |
| 2011/0141114 | A1 | 6/2011 | Chen |
| 2011/0205851 | A1 | 8/2011 | Harris |
| 2012/0120567 | A1 | 5/2012 | Hsieh |
| 2012/0274508 | A1 | 11/2012 | Brown et al. |
| 2013/0163390 | A1 | 6/2013 | Gossweiler |
| 2013/0222271 | A1* | 8/2013 | Alberth ............... G06F 1/163 345/173 |
| 2013/0342672 | A1 | 12/2013 | Gray |
| 2014/0107493 | A1 | 4/2014 | Yuen |
| 2014/0146248 | A1 | 5/2014 | Wang |
| 2015/0049000 | A1* | 2/2015 | He ................ G02B 27/017 345/1.3 |
| 2015/0049066 | A1 | 2/2015 | He |
| 2015/0049120 | A1* | 2/2015 | He ................ G02B 27/01 345/660 |

FOREIGN PATENT DOCUMENTS

| | | |
|---|---|---|
| CN | 2466691 Y | 12/2001 |
| CN | 1771454 A | 5/2006 |
| CN | 101091377 | 12/2007 |
| CN | 101494671 | 7/2009 |
| CN | 101542196 | 9/2009 |
| CN | 102063051 | 5/2011 |
| CN | 202486428 U | 10/2012 |
| CN | 102881229 | 1/2013 |
| CN | 202735594 U | 2/2013 |
| CN | 203101853 U | 7/2013 |
| CN | 103309040 A | 9/2013 |
| CN | 203241642 U | 10/2013 |
| CN | 203433196 U | 2/2014 |
| JP | 2001-311908 | 11/2001 |

OTHER PUBLICATIONS

First Office Action dated Apr. 6, 2016 out of corresponding Chinese priority Application No. 201310351409.3 (10 pages including English translation).

Final Rejection dated Feb. 24, 2016 out of U.S. Appl. No. 14/230,105 (6 pages).

U.S. Appl. No. 14/230,105 Non-Final Rejection dated Aug. 14, 2015 (23 pages).

Final Rejection dated Jun. 30, 2016 out of U.S. Appl. No. 14/230,068 (19 pages).

Office Action, and English language translation thereof, in corresponding Chinese Application No. 201310717724.3, dated Sep. 2, 2016, 29 pages.

First Office Action dated Nov. 28, 2016 (32 pages including English translation) out of Chinese priority Application No. 201410001174.X.

Second Office Action dated Dec. 28, 2016 (14 pages including English translation) out of Chinese priority Application No. 201310351409.3.

Second Office Action dated Jan. 5, 2017 (23 pages including English translation) out of corresponding Chinese priority Application No. 201310421847.2.

Non-Final Rejection dated Mar. 9, 2016 out of U.S. Appl. No. 14/230,068 (36 pages).

* cited by examiner

ELECTRONIC DEVICE AND DISPLAY METHOD

BACKGROUND

This application claims priority to Chinese patent application No. 201310351409.3 filed on Aug. 13, 2013; Chinese patent application No. 201310421847.2 filed on Sep. 16, 2013; and Chinese patent application No. 201410001174.X filed on Jan. 2, 2014; the entire contents of which are incorporated herein by reference.

The present disclosure relates to the field of electronic device, and more particularly to an electronic device with a built-in near-to-eye display system and a display method thereof.

Presently, the wearable electronic devices such as the smart watch is only provided with a conventional display such as a liquid crystal display (LCD), an organic electroluminesence display, an organic light emitting diode (OLED) display etc., in general. Limited by the size of the wearable electronic device such as the smart watch itself, the display area of the provided conventional display is generally very small, and only limited information can be displayed.

Therefore, it is desirable to provide an electronic device and a display method thereof, which is capable of not being limited by the size of the wearable electronic device such as the smart watch itself, and providing an image or video display with a larger size and a higher definition, thereby improving the related user experience. Moreover, it can provide more flexible component configuration manners, so as to adapt to particular designs for different usage patterns. Further, it can provide multiple wearing manners, a free combination and a switch between multiple functional modules adaptively, according to the different usage scenes, user requirements and content to be displayed.

SUMMARY

According to an embodiment of the present disclosure, an electronic device is provided, comprising: a main body apparatus comprising a processing unit which generates a first image and performs display control; a fixing apparatus connected with the main body apparatus, having at least a fixed state in which the fixing apparatus can be at least a part of an annular space or an approximate annular space meeting a first predetermined condition, the annular space or the approximate annular space being capable of surrounding an outer side of a cylinder meeting a second predetermined condition; and a first display unit arranged on the main body apparatus or the fixing apparatus, which outputs the first image, wherein the first display unit comprises a first display component which displays the first image, and a first optical component which receives light corresponding to the first image emitted from the first display component, and changes the light path of the light corresponding to the first image to form a magnified virtual image corresponding to the first image.

Also, in the electronic device according to the embodiment of the present disclosure, at least a part of the first optical component is a component the transmittance of which meets a predetermined condition in the outward direction of the annular space or the approximate annular space.

Also, in the electronic device according to the embodiment of the present disclosure, the transmittance of the electronic device meets a predetermined condition in the outward direction of the annular space or the approximate annular space corresponding to at least a part of the first optical component.

Also, the electronic device according to the embodiment of the present disclosure further comprises a second display unit the type of which is different from that of the first display unit, wherein one of the first display unit and the second display unit is arranged on the main body apparatus, the other of which is arranged on the fixing apparatus, and the display direction of the second display unit is the outward direction of the annular space or the approximate annular space.

Also, in the electronic device according to the embodiment of the present disclosure, the first display unit is arranged on the main body apparatus, and the second display unit is arranged on the fixing apparatus; or the second display unit is arranged on the main body apparatus and the first display unit is arranged on the fixing apparatus.

Also, the electronic device according to the embodiment of the present disclosure further comprises a sensor unit arranged on the main body apparatus or the fixing apparatus, which generates a first control signal when sensing that the first predetermined condition is met, the processing unit controlling the on/off of the first display unit according to the first control signal.

Also, in the electronic device according to the embodiment of the present disclosure, the sensor unit is an acceleration sensor, the acceleration component value in the gravity direction of the first control signal is larger than or equal to a predetermined value, and the processing unit controls the on/off of the first display unit according to the first control signal.

Also, the electronic device according to the embodiment of the present disclosure further comprises an image capturing unit arranged on the main body apparatus or the fixing apparatus, and an image capturing direction of the image capturing unit is opposite to an image output direction of the first display unit in the radial direction of the annular space or the approximate annular space.

Also, in the electronic device according to the embodiment of the present disclosure, the image capturing unit captures an interaction action of the user to generate a first image capturing signal, and the processing unit converts the first image capturing signal into a second control signal to control the display of the second image.

Also, in the electronic device according to the embodiment of the present disclosure, the image capturing unit captures a first sub image in the image capturing direction, and the processing unit generates a second sub image, and superimposes the first sub image with the second sub image to generate the first image.

Also, the electronic device according to the embodiment of the present disclosure further comprises a third display unit arranged on the main body apparatus or the fixing apparatus together with the first display unit, which outputs a third image, wherein the second display unit comprise a second display component for displaying the third image, and a second optical component for receiving light corresponding to the third image emitted from the second display component and changing the light path of the light corresponding to the third image to form a magnified virtual image corresponding to the third image.

According to another embodiment of the present disclosure, a display method applied to an electronic device is provided, the electronic device comprising: a main body apparatus comprising a processing unit which generates a first image and performs display control; a fixing apparatus connected with the main body apparatus, having at least a fixed state in which the fixing apparatus can be at least a part of an annular space or an approximate annular space meeting a first predetermined condition, the annular space or the approximate annular space being capable of surrounding an outer side of a cylinder meeting a second predetermined condition; and a first display unit arranged on the main body apparatus or the fixing apparatus, which outputs the first image, wherein the first display unit comprises a first display component which displays the first image, and a first optical component which receives light corresponding to the first image emitted from the first display component, and changes the light path of the light corresponding to the first image to form a magnified virtual image corresponding to the first image; the display method comprising: generating or acquiring an image signal for display; and performing display based on the image signal.

According to another embodiment of the present disclosure, an electronic device is provided, comprising: a main body apparatus comprising a processing unit which generates an image to be displayed and performs display control; a fixing apparatus connected with the main body apparatus, which maintains a relative location relationship between the electronic device and at least a part of body of a user; and a first display unit and a second display unit which output a first image and a second image respectively, wherein a first viewable part of the first display unit and a second viewable part of the second display unit are arranged on the main body apparatus, or the first viewable part and the second viewable part are arranged on the fixing apparatus, or one of the first viewable part and the second viewable part is arranged on the main body apparatus and the other one of the first viewable part and the second viewable part is arranged on the fixing apparatus; wherein the viewable part is a part in the display unit which is viewed by the user so that the user is aware of the display content, the first display unit and the second display unit are display units following different display principles.

Also, in the electronic device according to the embodiment of the present disclosure, the first display unit comprises a first display component which displays the first image, and a first optical component which receives light corresponding to the first image emitted from the first display component, and changes the light path of the light corresponding to the first image to form a magnified virtual image corresponding to the first image, and at least a part of the first optical component is the first viewable component.

Also, in the electronic device according to the embodiment of the present disclosure, the first display unit and the second display unit display at the same time or display respectively, under the control of the processing unit.

Also, in the electronic device according to the embodiment of the present disclosure, the fixing apparatus has at least a fixed state in which the fixing apparatus can be at least a part of an annular space or an approximate annular space meeting a first predetermined condition, the annular space or the approximate annular space being capable of surrounding an outer side of a cylinder meeting a second predetermined condition.

Also, in the electronic device according to the embodiment of the present disclosure, the first viewable part and the second viewable part have a first state in which they are arranged on the fixing apparatus or the main body apparatus overlapped with each other, and the transmittance of at least the viewable parts at the outer side of the annular space or the approximate annular space in the first viewable part and the second viewable part meets a predetermined condition in an outward direction of the annular space or the approximate annular space.

Also, in the electronic device according to the embodiment of the present disclosure, the first viewable part is at the outer side.

Also, in the electronic device according to the embodiment of the present disclosure, the first viewable part and the second viewable part have a second state in which they are arranged on the fixing apparatus or the main body apparatus adjacently with each other.

Also, in the electronic device according to the embodiment of the present disclosure, the display direction of the first viewable part and the second viewable part is the outward direction of the annular space or the approximate annular space.

Also, in the electronic device according to the embodiment of the present disclosure, the display direction of one of the first viewable part and the second viewable part is the outward direction of the annular space or the approximate annular space, and the display direction of the other one of the first viewable part and the second viewable part is a direction vertical to the outward direction of the annular space or the approximate annular space.

Also, in the electronic device according to the embodiment of the present disclosure, the main body apparatus further comprises a first sub unit and a second sub unit, one of the first viewable part and the second viewable part is arranged on the first sub unit, the other one of the first viewable part and the second viewable part is arranged on the second sub unit, and the first sub unit and the second sub unit are connected via a connecting unit, so that the first viewable part and the second viewable part are switched between the first state and a third state in which they are not arranged overlapped with each other.

Also, in the electronic device according to the embodiment of the present disclosure, the first sub unit can slide or rotate with respect to the second sub unit with respect to the connecting unit.

Also, in the electronic device according to the embodiment of the present disclosure, the first viewable part is arranged in the first sub unit, and the transmittance of the first viewable part meets a predetermined condition in the outward direction of the annular space or the approximate annular space in the third state.

Also, in the electronic device according to the embodiment of the present disclosure, the user can view the display of the first viewable part in a viewing direction meeting a third predetermined condition in the first state and the third state.

Also, the electronic device according to the embodiment of the present disclosure further include a sensor unit arranged on the main body apparatus or the fixing apparatus, and the processing unit determines the display of the first viewable part according to signal acquired by the sensor unit.

Also, in the electronic device according to the embodiment of the present disclosure, the reference direction of the sensor unit is correlated with the viewable direction of the first viewable part.

According to another embodiment of the present disclosure, a display method applied to an electronic device is provided, the electronic device comprising: a main body apparatus comprising a processing unit which generates an image to be displayed and performs display control; a fixing apparatus connected with the main body apparatus, which maintains a relative location relationship between the electronic device and at least a part of body of a user; and a first display unit and a second display unit which output a first image and a second image respectively, wherein a first viewable part of the first display unit and a second viewable part of the second display unit are arranged on the main body apparatus, or the first viewable part and the second viewable part are arranged on the fixing apparatus, or one of the first viewable part and the second viewable part is arranged on the main body apparatus and the other one of the first viewable part and the second viewable part is arranged on the fixing apparatus; wherein the viewable part is a part in the display unit which is viewed by the user so that the user is aware of the display content, the first display unit and the second display unit are display units following different display principles; the display method comprising: generating or acquiring an image signal for display; and performing display based on the image signal.

According to another embodiment of the present disclosure, an electronic device is provided, comprising: a main body apparatus comprising a processing unit which generates a first image and performs display control; a fixing apparatus connected with the main body apparatus, having at least a fixed state in which the fixing apparatus can be at least a part of an annular space or an approximate annular space meeting a first predetermined condition, the annular space or the approximate annular space being capable of surrounding an outer side of a cylinder meeting a second predetermined condition; and a first display unit arranged on the main body apparatus and/or the fixing apparatus, which outputs the first image, wherein the first display unit comprises a first display component which displays the first image, and a first optical component which receives light corresponding to the first image emitted from the first display component, and changes the light path of the light corresponding to the first image to form a magnified virtual image corresponding to the first image, and the first display unit further comprises a flexible waveguide sub component.

Also, the electronic device according to the embodiment of the present disclosure further comprises a connection apparatus through which the main body apparatus and the fixing apparatus are connected and are capable of moving with respect to each other; the first display unit is arranged on the main body apparatus and the fixing apparatus, the flexible waveguide sub component is arranged correspondingly to the connection apparatus, so that the flexible waveguide sub component can be used to guild and deliver light when the main body apparatus and the fixing apparatus are at different relative locations.

Also, in the electronic device according to the embodiment of the present disclosure, the flexible waveguide sub component is arranged between the first display component and the first optical component, and is used to guild the light corresponding to the first image to the first optical component.

Also, in the electronic device according to the embodiment of the present disclosure, the flexible waveguide sub component is arranged in the first display component or the first optical component.

Also, in the electronic device according to the embodiment of the present disclosure, the flexible waveguide sub component arranged in the first display component is used to guild light before the first image is formed, the flexible waveguide sub component arranged between the first display component and the first optical component or arranged in the first optical component is used to guild the light corresponding to the first image after the first image is formed.

Also, in the electronic device according to the embodiment of the present disclosure, the first display component comprise a light source sub component for emitting imaging illumination light and a micro display sub component for displaying the first image, and the flexible waveguide sub component is arranged between the light source sub component and the micro display sub component, to guild the light emitted by the light source sub component to the micro display sub component.

Also, in the electronic device according to the embodiment of the present disclosure, the first optical component comprises a receiving sub component for receiving the light corresponding to the first image and an imaging sub component for forming the magnified virtual image corresponding to the first image, and the flexible waveguide sub component is arranged between the receiving sub component and the imaging sub component, to guild the light corresponding to the first image to the imaging sub component.

Also, the electronic device according to the embodiment of the present disclosure further comprises a second display unit arranged on the main body apparatus or the fixing apparatus, which outputs a second image, wherein the first display unit and the second display unit are display units following different display principles.

Also, in the electronic device according to the embodiment of the present disclosure, the first display unit and the second display unit are partly overlapped.

Also, in the electronic device according to the embodiment of the present disclosure, the first display unit has a first viewable part, the second display unit has a second viewable part, the first viewable part and the second viewable part are parts viewed by the user so that the user gets aware of the display content, and the flexible waveguide sub component and the second viewable part are overlapped in the display direction of the second viewable part or the opposite direction of the display direction.

Also, in the electronic device according to the embodiment of the present disclosure, the processing unit determines whether an application requesting to be displayed meets a first predetermined condition or not based on an attribute of the application, and generates the first image corresponding to the application if the first predetermined condition is met, otherwise generates the second image corresponding to the application.

Also, in the electronic device according to the embodiment of the present disclosure, the processing unit determines whether individual display content of an application requesting to be displayed meets a second predetermined condition or not based on an attribute of the individual display content of the application, and generates the second image corresponding to the application if the second predetermined condition is met, otherwise generates the second image corresponding to the display content.

According to another embodiment of the present disclosure, a display method applied to an electronic device is provided, the electronic device comprising: a main body apparatus comprising a processing unit which generates a first image and performs display control; a fixing apparatus connected with the main body apparatus, which maintains a relative location relationship between the electronic device and at least a part of body of a user; and a first display unit arranged on the main body apparatus and/or the fixing apparatus, which outputs the first image, wherein the first display unit comprises a first display component which displays the first image, and a first optical component which receives light corresponding to the first image emitted from the first display component, and changes the light path of the light to form a magnified virtual image, the first display unit further comprises a flexible waveguide sub component; the display method comprising: generating or acquiring an image signal for display; and performing display based on the image signal.

Also, in the display method according to the embodiment of the present disclosure, the electronic device further comprises a second display unit arranged on the main body apparatus or the fixing apparatus, which outputs a second image, the first display unit and the second display unit are display units following different display principles, and the step of generating or acquiring an image signal for display comprises: determining whether an application requesting to be displayed meets a first predetermined condition or not based on an attribute of the application, and generating the first image corresponding to the application if the first predetermined condition is met, otherwise generating the second image corresponding to the application.

Also, in the display method according to the embodiment of the present disclosure, the electronic device further comprises a second display unit arranged on the main body apparatus or the fixing apparatus, which outputs a second image, the first display unit and the second display unit are display units following different display principles, and the step of generating or acquiring an image signal for display comprises: determining whether individual display content of an application requesting to be displayed meets a second predetermined condition or not based on an attribute of the individual display content of the application, and generating the first image corresponding to the display content if the second predetermined condition is met, otherwise generating the second image corresponding to the display content.

The electronic device and the display method according to the embodiments of the present disclosure are not limited by the size of the wearable electronic device such as the smart watch itself, and the image or video display with a larger size and a higher definition is provided. Also, the power consumption of the electronic device is relatively low compared to the micro projector for displaying a large image, the electronic device is not limited by the usage scene and well usage privacy is also provided. Moreover, it can provide more flexible component configuration manners, so as to adapt to particular designs for different usage patterns. Further, it can provide multiple wearing manners, a free combination and a switch between multiple functional modules adaptively according to the different usage scenes, user requirements and content to be displayed. The electronic device and the display method according to the embodiments of the present disclosure greatly improve user experience of the wearable electronic device.

It should be noted that the above general description and the following detailed description are exemplary and are intended to provide a further description of the technology to be protected.

DETAILED DESCRIPTION

Hereinafter the embodiments of the disclosure will be described with reference to the accompany drawings.

(First Implementation)

First, the electronic device according to an embodiment of the present disclosure will be described with reference to FIGS. 1A-1C. The electronic device according to the embodiment of the present disclosure may be a wearable electronic device such as a smart watch. Of course, it will be easily understood by those skilled in the art that the electronic device according to the embodiment of the present disclosure is not limited thereto, but may be any electronic device with a display unit therein. For the convenience of description, it will be described taking the wearable electronic device such as the smart watch as an example.

Figure 1A:
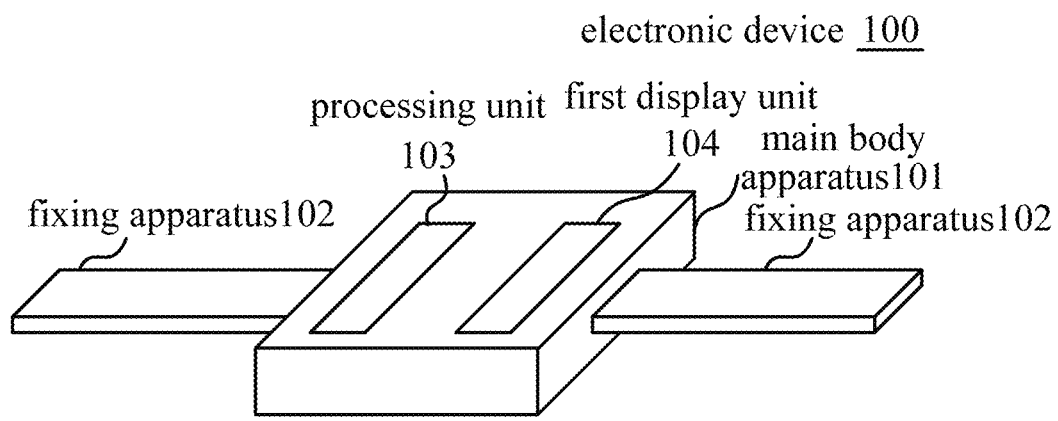
FIGS. 1A-1E are structural diagrams showing an electronic device according to a first embodiment of the present disclosure.

FIGS. 1A-1E are structural diagrams showing an electronic device according to a first embodiment of the present disclosure. As shown in FIG. 1A, the electronic device 100 according to the embodiment of the present disclosure includes a main body apparatus 101 and a fixing apparatus 102. The fixing apparatus 102 is connected with the main body apparatus 101. The fixing apparatus 102 has at least a fixed state in which the fixing apparatus 102 can be at least a part of an annular space or an approximate annular space meeting a first predetermined condition, the annular space or the approximate annular space being capable of surrounding an outer side of a cylinder meeting a second predetermined condition.

Figure 1B:
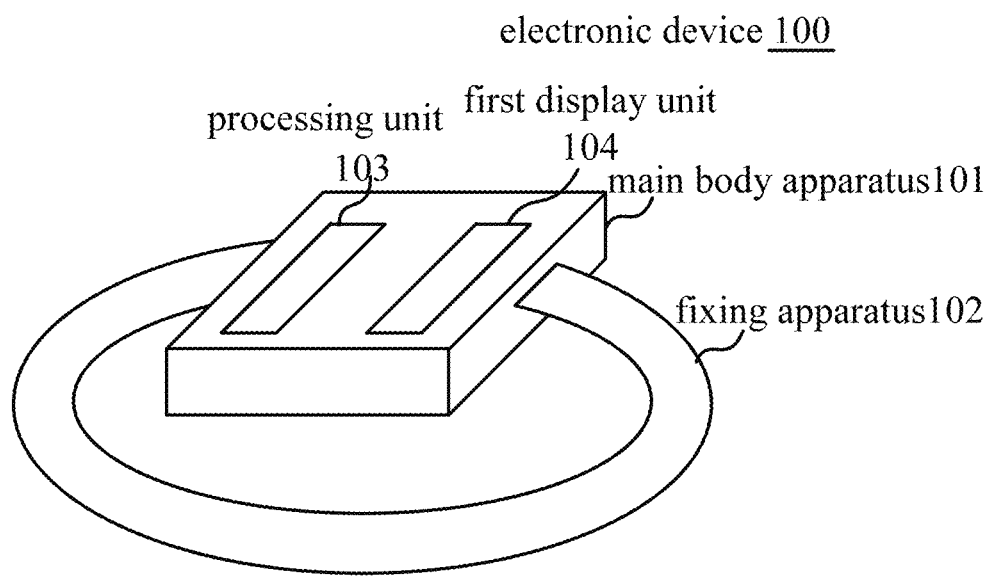
Figure 1C:
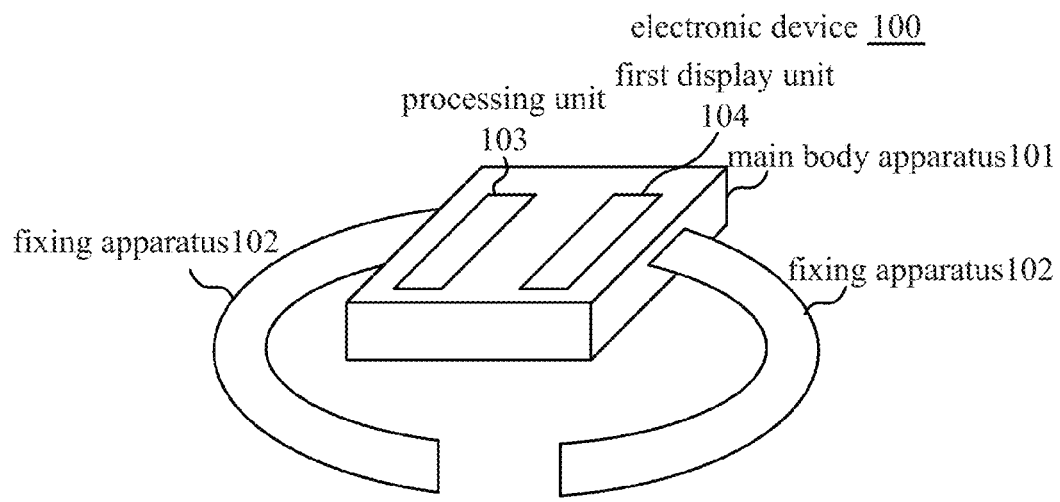

Particularly, FIGS. 1B and 1C are diagrams showing two fixed states in which the fixing apparatus 102 is connected with the main body apparatus 101. In the first fixed state as shown in FIG. 1B, the fixing apparatus 102 and the main body apparatus 101 form a closed-loop annular space. In the second fixed state as shown in FIG. 1C, the fixing apparatus 102 and the main body apparatus 101 form an approximate annular space with a small opening. In an embodiment of the present disclosure, the main body apparatus 101 is a dial section of the smart watch, and the fixing apparatus 102 is a watchband section of the smart watch. The annular space or the approximate annular space formed by the main body apparatus 101 and the fixing apparatus 102 can surround a wrist (as the cylinder) of a user of the smart watch, and the diameter of the annular space or the approximate annular space is larger than the diameter of the wrist of the user and smaller than the diameter of the first of the user.

Figure 1D:
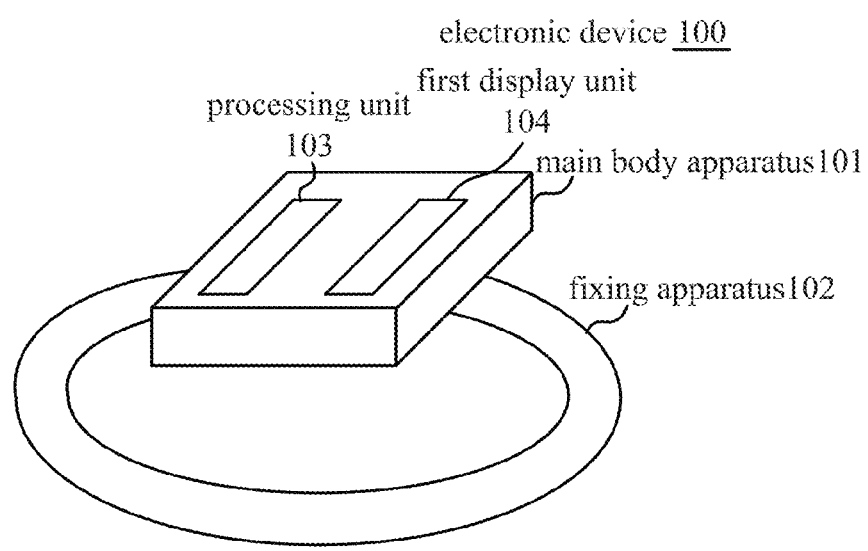
Figure 1E:
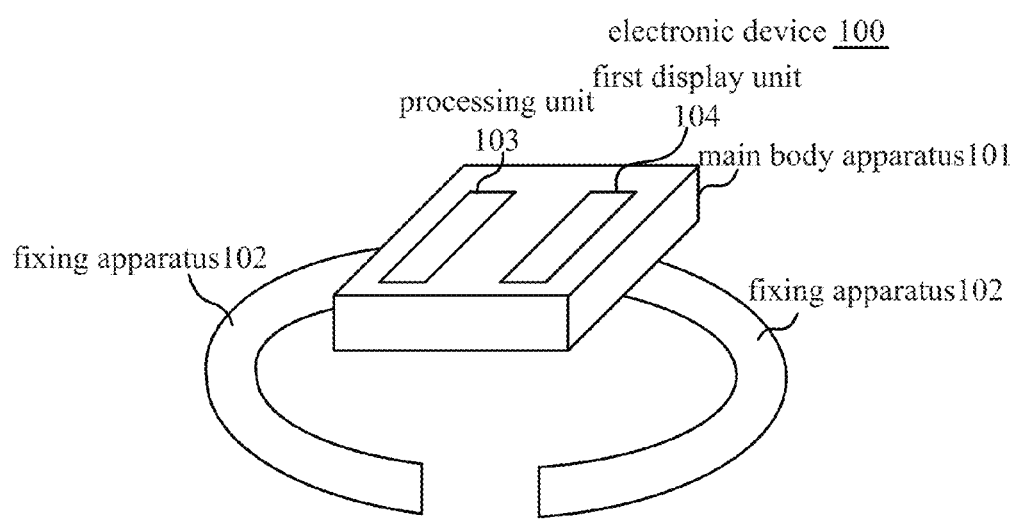

Also, of course, the annular space or the approximate annular space may be formed by the fixing apparatus 102 alone. As shown in FIGS. 1D and 1E, the main body apparatus 101 may be arranged on the fixing apparatus 102 (i.e., the main body apparatus 101 is attached to the fixing apparatus 102 by way of surface contact), so that only the fixing apparatus 102 itself forms the annular space (FIG. 1D) or the approximate annular space (FIG. 1E) surrounding the cylinder from the outside. The fixing apparatus 102 is arranged with a fixing structure such as an agraffe, a snap fastener or a slide fastener, etc. (not shown).

Further, as shown by FIGS. 1A-1E, the main body apparatus 101 is arranged with a processing unit 103 and a first display unit 104 thereon. The processing unit 103 is used to generate a first image and perform display control. In the electronic device 100 shown in FIGS. 1A-1E, the first display unit 104 is arranged on the main body apparatus 101. However, it will be easily understood by those skilled in the art that the present disclosure is not limited thereto. The first display unit 104 may also be arranged on the fixing apparatus 102. The principle and implementation of the first display unit 104 will be described in detail with reference to FIGS. 2A-2D and FIGS. 3A-3C.

Figure 2A:
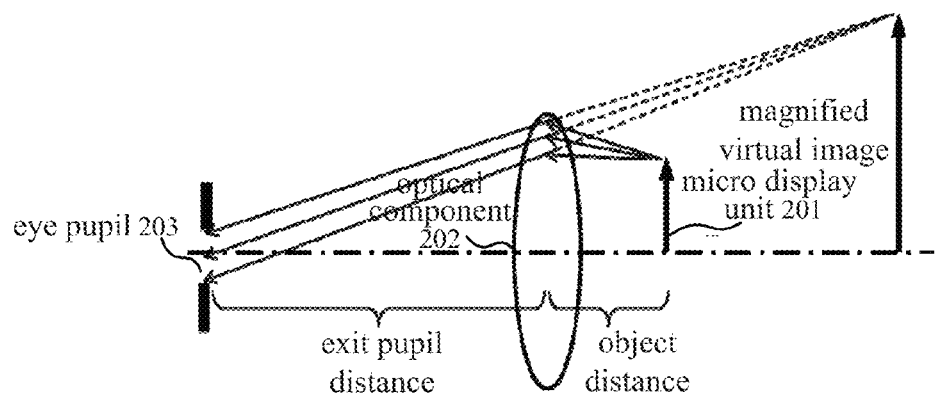
FIGS. 2A-2D are principle diagrams showing a near-to-eye display system applied in the electronic device according to the first embodiment of the present disclosure.

FIG. 2A is a principle diagram showing the near-to-eye optical display system applied in the electronic device according to the first embodiment of the present disclosure. In the electronic device according to the first embodiment of the present disclosure, the near-to-eye optical display system is used as the first display unit 104. As shown in FIG. 2, the light corresponding to the display image emitted by the micro display unit 201 in the near-to-eye optical display system is received via an optical component 202 such as a lens group, and the light path is changed. As a result, the light with the light path changed goes into the pupil 203 of the viewer and a magnified virtual image is formed.

Figure 2B:
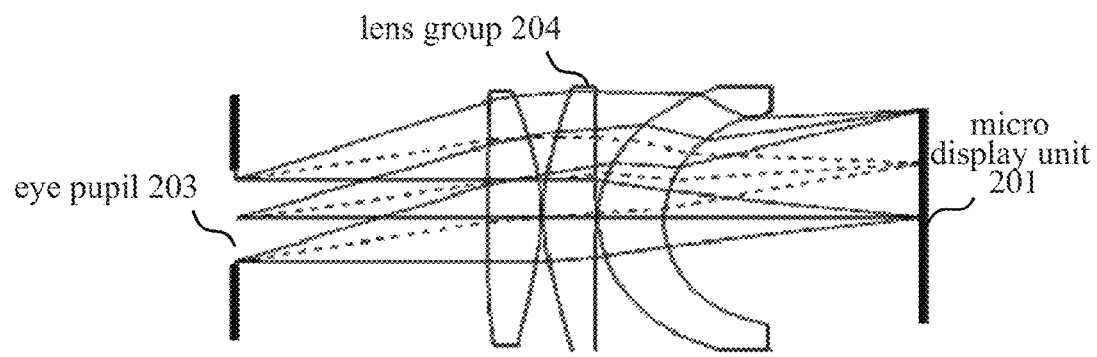
Figure 2C:
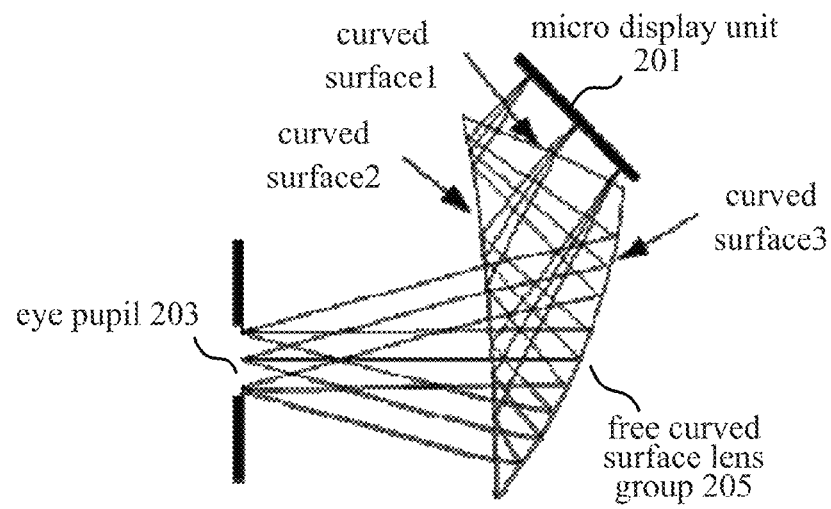
Figure 2D:
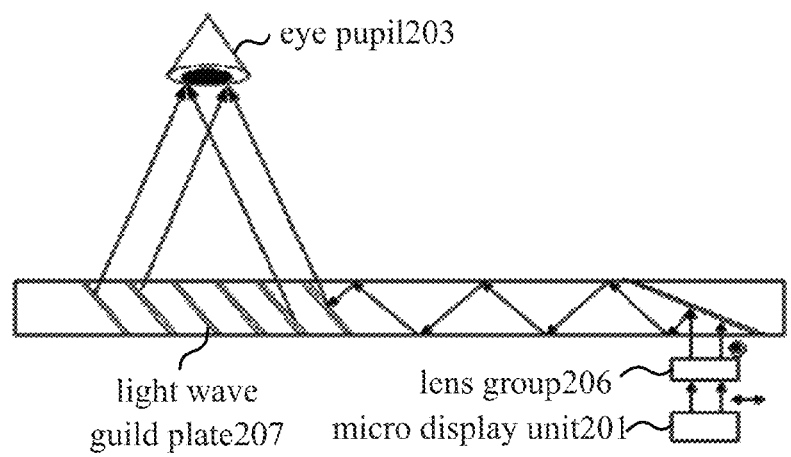

FIGS. 2B-2D further show three detailed implementations based on the principle diagram shown in FIG. 2A. Particularly, the technical solution in FIG. 2B adopts the mixed refraction and diffraction curved surface design, wherein the lens group 204 corresponds to the optical component 202 shown in FIG. 2A, thereby the required glass volume is reduced. The technical solution in FIG. 2C adopts a free curved surface design, wherein a free curved surface lens group 205 including a curved surface 1, a curved surface 2 and a curved surface 3 corresponds to the optical component 202 shown in FIG. 2A, thereby the required glass volume is further reduced. The technical solution in FIG. 2D adopts a parallel plate design, wherein except for the lens group 206 corresponding to the optical component 202 shown in FIG. 2A, a light waveguide plate 207 is also included. By using the light waveguide plate 207, a control such as a translation on the exit direction of the light forming the magnified virtual image (i.e., the display direction of the magnified virtual image) can be performed while the required glass thickness is reduced. It is easy to be understood by those skilled in the art that the near-to-eye optical display system adopted in the electronic device according to the first embodiment of the present disclosure is not limited to those shown in FIGS. 2B-2D, but can adopt other implementations such as the projective eyepiece design.

Figure 3A:
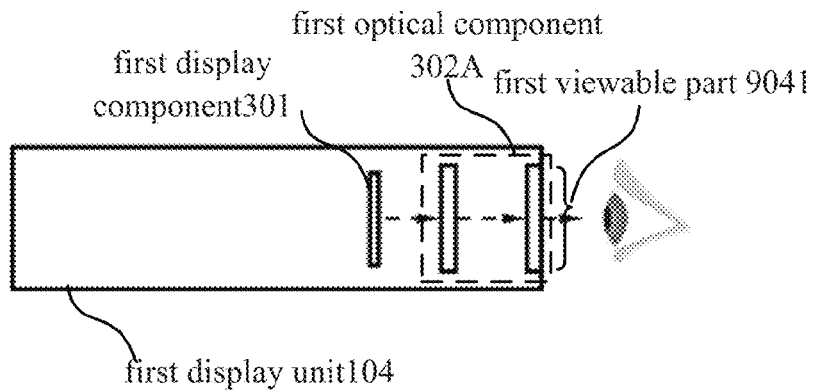
FIGS. 3A-3C are schematic diagrams showing a display unit in the electronic device according to the first embodiment of the present disclosure.
Figure 3B:
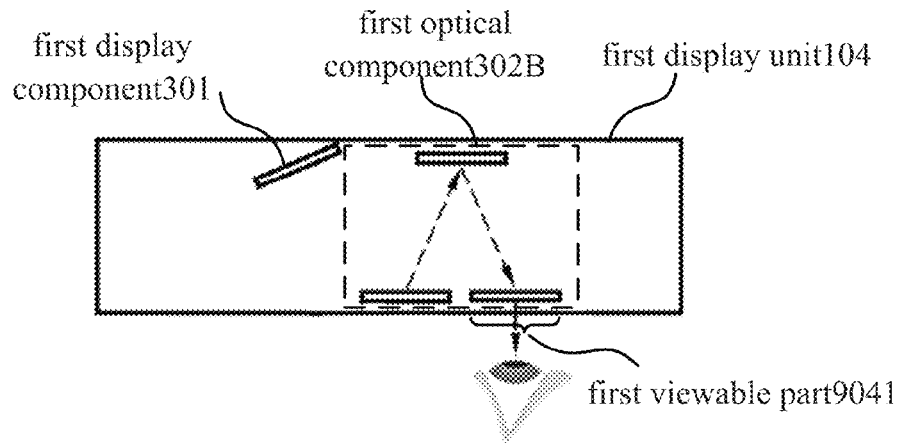
Figure 3C:
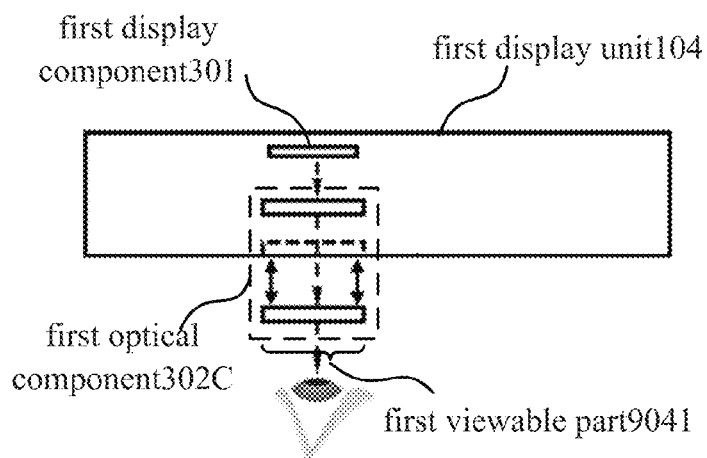

FIGS. 3A-3C are schematic diagrams showing a display unit in the electronic device according to the first embodiment of the present disclosure. The first display unit 104 in the electronic device 100 according to the first embodiment of the present disclosure adopts the near-to-eye optical display system as described above with reference to FIG. 2. The first display unit 104 includes a first display component 301 which displays the first image, and a first optical component 302 (the first optical components 302A-302C in FIGS. 3A-3C) which receives light corresponding to the first image emitted from the first display component 301, and changes the light path of the light corresponding to the first image to form a magnified virtual image corresponding to the first image.

Particularly, in FIG. 3A, the first display component 301 may be the micro display, and the first optical component 302A is formed by the lens group. The lens group forms the magnified virtual image corresponding to the first image displayed by the first display component 301.

In FIG. 3B, the first display component 301 may also be a micro display, and the first optical component 302B is formed by an optical device reflecting multiple times in the electronic device. In this case, compared to the first optical component 302A shown in FIG. 3A, the space necessary for the first display unit 104 may be saved, and it is convenient for the design and manufacture of the further minimized electronic device.

In FIG. 3C, the first display component 301 may also be a micro display, and the first optical component 302C is formed by a zoom lens group driven by a driving unit (not shown) in the electronic device. In this case, compared to the first optical component 302A shown in FIG. 3A, the size of the magnified virtual image displayed by the first display unit 104 may be adjusted dynamically by zooming, so as to meet different user requirements. In this way, by displaying a magnified virtual image using the display component and the optical system, it is not limited by the size of the wearable electronic device such as the smart watch itself, and the image or video display with a larger size and a higher definition is provided with a relatively small display screen. Also, compared to the micro projector for displaying a large image, the power consumption of the electronic device is low, and it is not limited by the usage scene, and well usage privacy is provided.

In the electronic device 100 described above with reference to FIGS. 1A-1C and FIGS. 3A-3C, at least a part of the first optical component 302 is a component the transmittance of which meets a predetermined condition in the outward direction of the annular space or the approximate annular space. The at least a part of the first optical component 302 is a region corresponding to the display image when displaying. More generally, the transmittance of the electronic device 100 meets a predetermined condition in the outward direction of the annular space or the approximate annular space corresponding to the at least a part of the first optical component 302. The predetermined condition may be that the transmittance is larger than or equal to a predetermined value (such as 70%). In this way, the user may see his/her skin through the electronic device 100.

Figure 4:
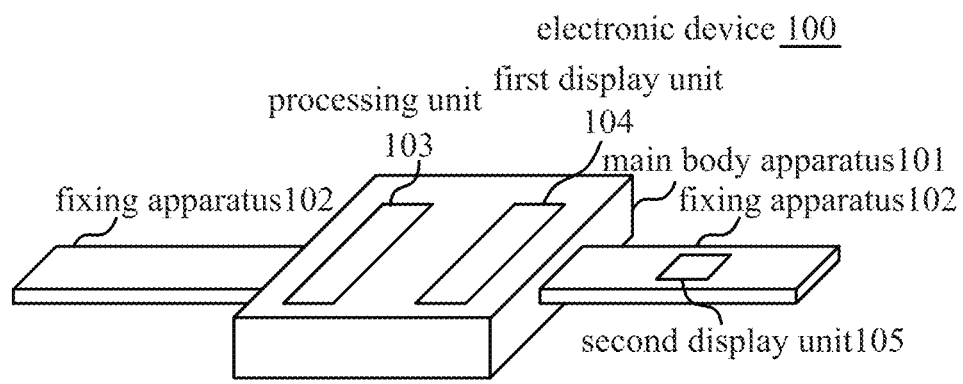
FIG. 4 is a structural diagram showing an electronic device according to a second embodiment of the present disclosure.

FIG. 4 is a structural diagram showing an electronic device according to a second embodiment of the present disclosure. Compared to the electronic device 100 according to the first embodiment of the present disclosure described above with reference to FIGS. 1A-1E, the electronic device 200 according to a second embodiment of the present disclosure shown in FIG. 4 further includes a second display unit 105. The type of the second display unit 105 is different from that of the first display unit 104. For example, the second display unit 105 includes, but not limited to, a liquid crystal display (LCD) unit, an organic electro luminescence display unit, an organic light emitting diode (OLED) display unit, or an E Ink type display unit, etc.

One of the first display unit 104 and the second display unit 105 is arranged on the main body apparatus 101, and the other one is arranged on the fixing apparatus 102. As shown in FIG. 4, the first display unit 104 is arranged on the main body apparatus 101, and the second display unit 105 is arranged on the fixing apparatus 102. Of course, the second display unit 105 may be arranged on the main body apparatus 101, and the first display unit 104 is arranged on the fixing apparatus 102. Similarly to the first display unit 104, the display direction of the second display unit 105 is the outward direction of the annular space or the approximate annular space. Generally, the second display unit 105 is used to display content which does not need to be magnified, such as time indication, etc.

Also, it is not limited to the case shown in FIG. 4, the first display unit 104 and the second display unit 105 may be arranged on the main body apparatus 101 or the fixing apparatus 102 at the same time. For example, the first display unit 104 and the second display unit 105 are arranged on the main body apparatus 101 side by side. Alternatively, the first display unit 104 and the second display unit 105 are arranged on two opposite locations across the radial direction of the fixing apparatus 102.

Figure 5:
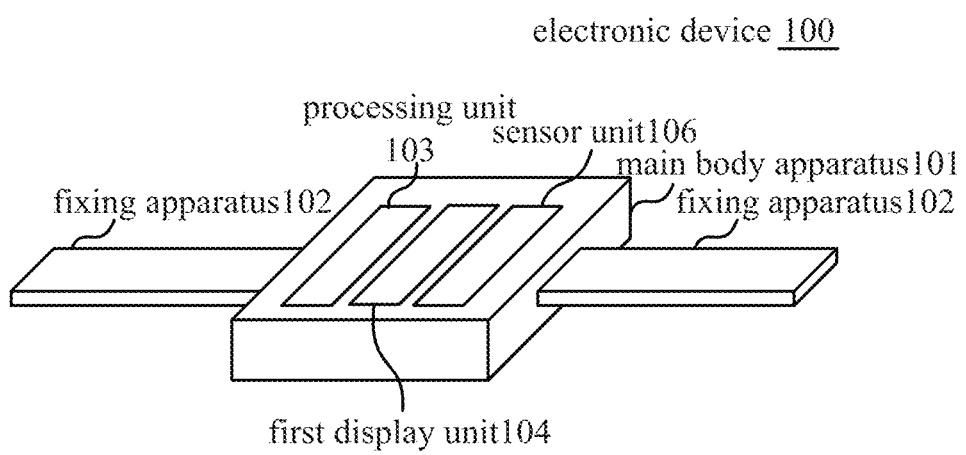
FIG. 5 is a structural diagram showing an electronic device according to a third embodiment of the present disclosure.

FIG. 5 is a structural diagram showing an electronic device according to a third embodiment of the present disclosure. Compared to the electronic device 100 according to the first embodiment of the present disclosure described above with reference to FIGS. 1A-1E, the electronic device 300 according to a third embodiment of the present disclosure shown in FIG. 5 further includes a sensor unit 106. As shown in FIG. 5, the sensor unit 106 is arranged on the main body apparatus 101. However, the sensor unit 106 may also be arranged on the fixing apparatus 102.

The sensor unit 106 is used to generate a first control signal when sensing that the first predetermined condition is met. The processing unit 103 controls the on/off of the first display unit 104 according to the first control signal. In an embodiment of the present disclosure, the sensor unit 106 is an acceleration sensor, the acceleration component value in the gravity direction of the first control signal is larger than or equal to a predetermined value (that is, the user pulls down the electronic device 100 from the use state in which the first display unit 104 is watched), and the processing unit 103 controls to turn down the first display unit 104 according to the first control signal. It will be easily understood by those skilled in the art that the sensor unit 106 according to the embodiment of the present disclosure is not limited to the acceleration sensor, but may include other sensor unit which can generate the control signal.

Figure 6A:
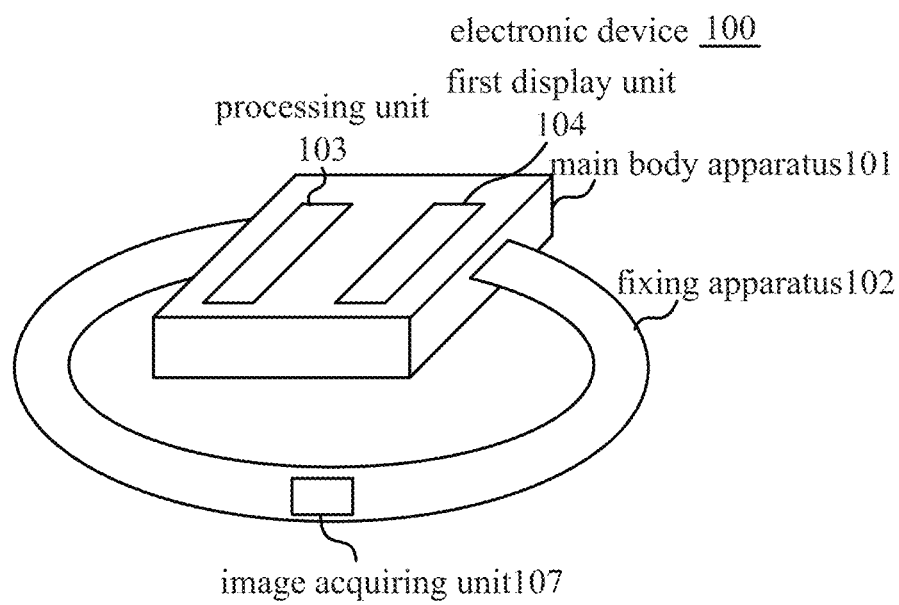
FIGS. 6A and 6B are structural diagrams showing an electronic device according to a fourth embodiment of the present disclosure.
Figure 6B:
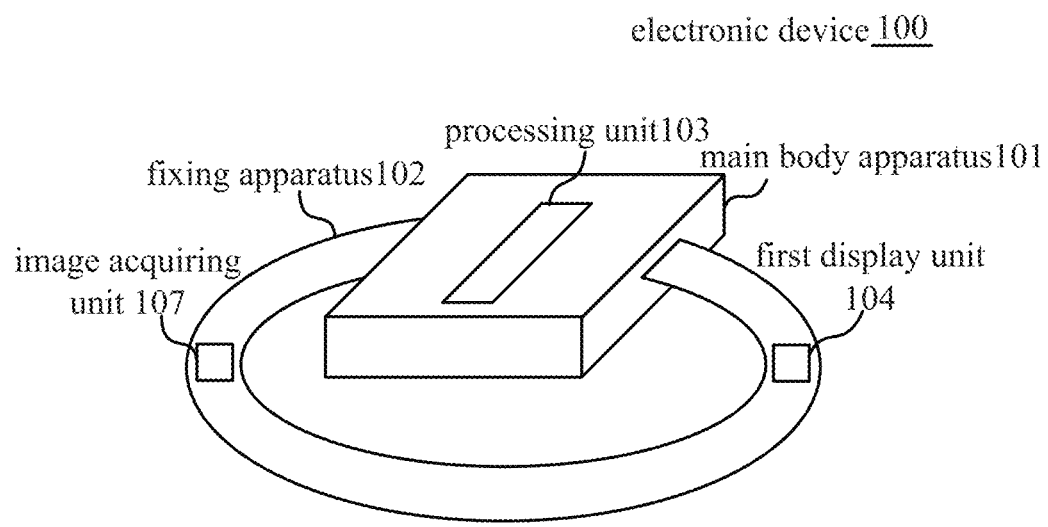

FIGS. 6A and 6B are structural diagrams showing an electronic device according to a fourth embodiment of the present disclosure. Compared to the electronic device 100 according to the first embodiment of the present disclosure described above with reference to FIGS. 1A-1E, the electronic device 400 according to the fourth embodiment of the present disclosure shown in FIGS. 6A and 6B further includes an image capturing unit 107. The image capturing unit 107 may be arranged on the main body apparatus 101 or the fixing apparatus 102. Particularly, FIG. 6A shows the case in which the first display unit 104 is arranged on the main body apparatus 101 and the image capturing unit 107 is arranged on the fixing apparatus 102. FIG. 6B shows the case in which both the first display unit 104 and the image capturing unit 107 are arranged on the fixing apparatus 102. No matter the case in FIG. 6A or FIG. 6B, the image capturing direction of the image capturing unit 107 is opposite to an image output direction of the first display unit 104 in the radial direction of the annular space or the approximate annular space.

In an embodiment of the present disclosure, the image capturing unit 107 is used to capture an interaction action of the user to generate a first image capturing signal, the processing unit 103 converts the first image capturing signal into a second control signal to control the first display unit 104 to display the second image.

In another embodiment of the present disclosure, the image capturing unit 107 is used to capture a first sub image in the image capturing direction, and the processing unit 103 generates a second sub image which may be an identification image about the first sub image acquired by analyzing the first sub image, and may also be an identification image acquired based on the sensor such as the GPS sensor. Also, the second sub image may also be an identification image acquired from a server through network based on feature information acquired from the first sub image. The first sub image is superimposed with the second sub image to generate the first image for display by the first display unit 104.

Figure 7:
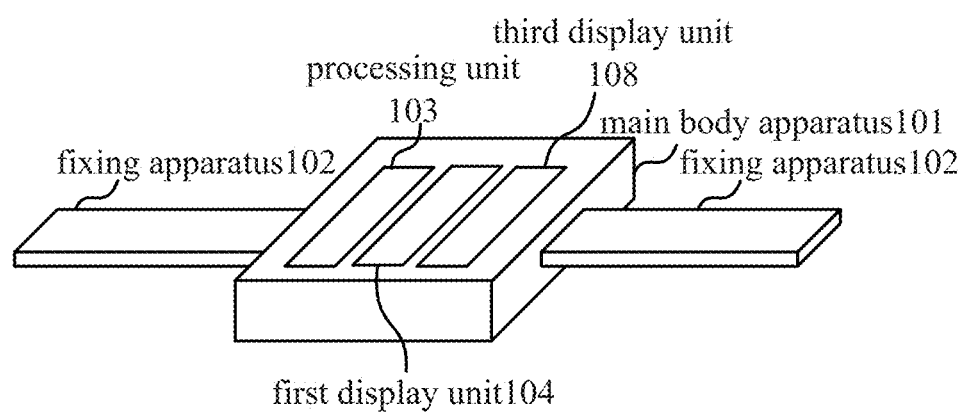
FIG. 7 is a structural diagram showing an electronic device according to a fifth embodiment of the present disclosure.

FIG. 7 is a structural diagram showing an electronic device according to a fifth embodiment of the present disclosure. Compared to the electronic device 100 according to the first embodiment of the present disclosure described above with reference to FIGS. 1A-1E, the electronic device 500 according to the fifth embodiment of the present disclosure shown in FIG. 7 further includes a third display unit 108. In the electronic device 100 shown in FIG. 7, the third display unit 108 is arranged on the main body apparatus 101 together with the first display unit 104. It will be easily understood that the present disclosure is not limited thereto. The third display unit 108 may be arranged on the fixing apparatus 102 together with the first display unit 104.

The third display unit 108 is a display unit with the same type as that of the first display unit 104. That is, the third display unit includes a second display component (not shown) for displaying the third image, and a second optical component (not shown) for receiving light corresponding to the third image emitted from the second display component and changing the light path of the light corresponding to the third image to form a magnified virtual image corresponding to the third image. The third image is related to the first image. When both eyes of the viewer watches the first display unit 104 and the third display unit 108 respectively, the viewer is enabled to be aware of a 3D image corresponding to the first image and the third image.

The electronic device according to the embodiments of the present disclosure has been described above with reference to FIGS. 1A to 7. In the following, the display method used by the electronic device will be described with reference to FIG. 8.

Figure 8:
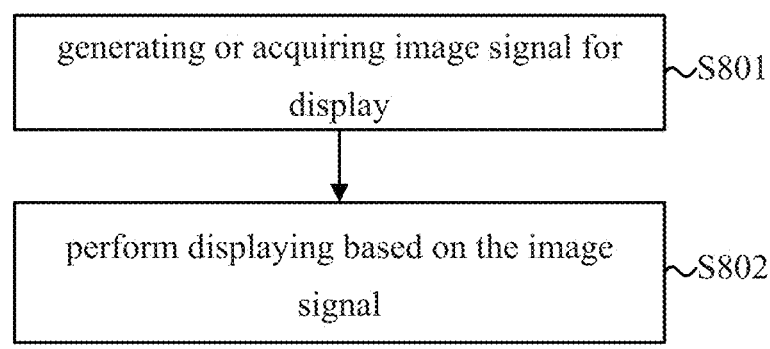
FIG. 8 is a flowchart showing a display method according to a first implementation of the present disclosure.

FIG. 8 is a flowchart showing the display method according to an embodiment of the present disclosure. The display method shown in FIG. 8 is applied to the electronic device shown in FIG. 1. As described above, the electronic device includes a main body apparatus having a processing unit which generates a first image and performs display control; a fixing apparatus connected with the main body apparatus, having at least a fixed state in which the fixing apparatus can be at least a part of an annular space or an approximate annular space meeting a first predetermined condition, the annular space or the approximate annular space being capable of surrounding an outer side of a cylinder meeting a second predetermined condition; and a first display unit arranged on the main body apparatus or the fixing apparatus, which outputs the first image, wherein the first display unit comprises a first display component which displays the first image, and a first optical component which receives light corresponding to the first image emitted from the first display component, and changes the light path of the light corresponding to the first image to form a magnified virtual image corresponding to the first image.

The display method includes generating or acquiring an image signal for display (step S801); and performing display based on the image signal (step S802).

In the step S801, the processing unit 103 of the electronic device 100 may generate an image signal for display. Also, the electronic device 100 may acquire the image signal for display from the server or another electronic device through a communication unit. Then, the process goes to the step S802.

In the step S802, the display unit of the electronic device 100 performs displaying based on the image generated or acquired in the step S801. Particularly, as described above, the step of performing displaying may include displaying a magnified virtual image corresponding to the image signal through the display unit including the display component and the optical component. Also, the step of performing displaying may further include generating a control signal based on the signal acquired by the sensor to control the on/off of the display of the image signal, etc. Further, the step of performing displaying may further include displaying a magnified 3D virtual image corresponding to the image signal through two display units including the display component and the optical component.

(Second Implementation)

Next, the electronic device according to an embodiment of the present disclosure will be described with reference to FIGS. 9A-9C. The electronic device according to an embodiment of the present disclosure may be applied to a wearable electronic device such as the smart watch. Of course, it will be easily understood by those skilled in the art that the electronic device according to an embodiment of the present disclosure is not limited thereto, and can include any electronic device having a display unit therein. For the convenience of description, the description will be made taking the wearable electronic device such as the smart watch as an example.

Figure 9A:
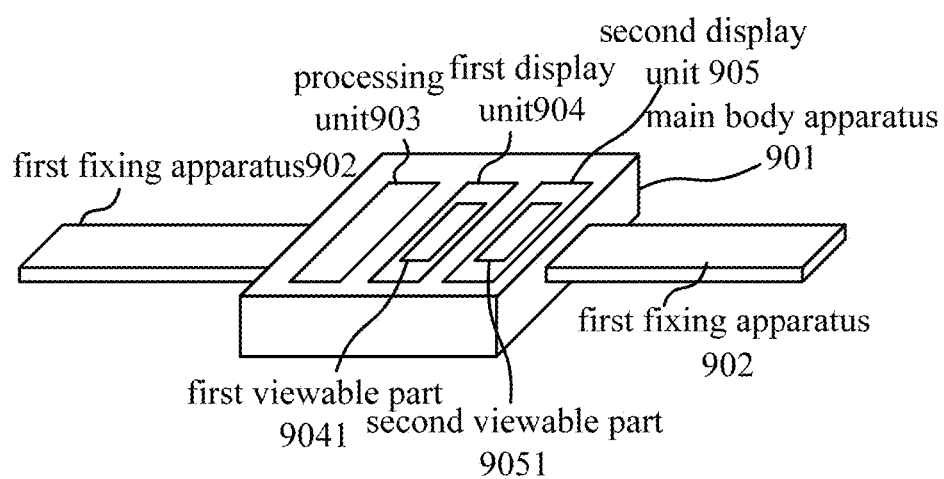
FIGS. 9A-9C are structural diagrams showing an electronic device according to an embodiment of the present disclosure.
Figure 9B:
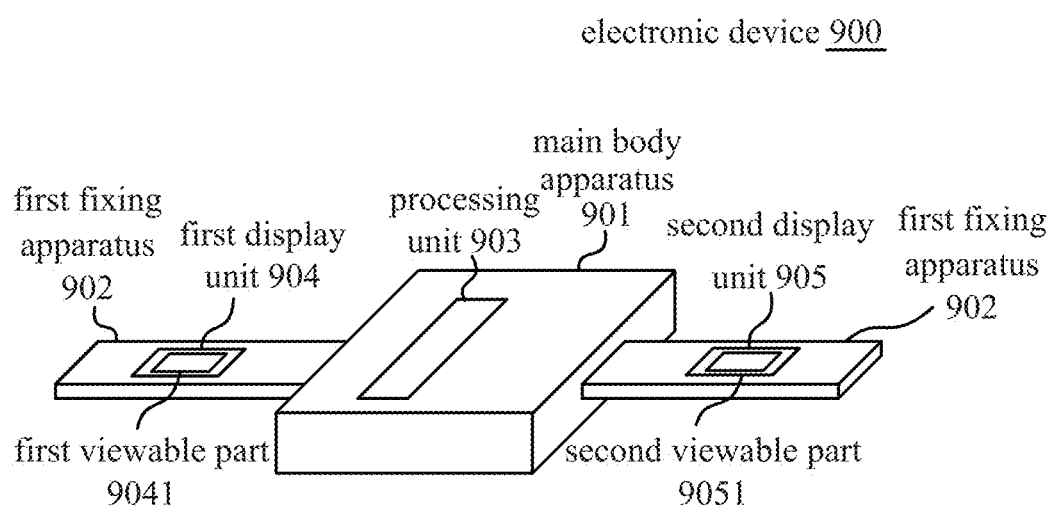
Figure 9C:
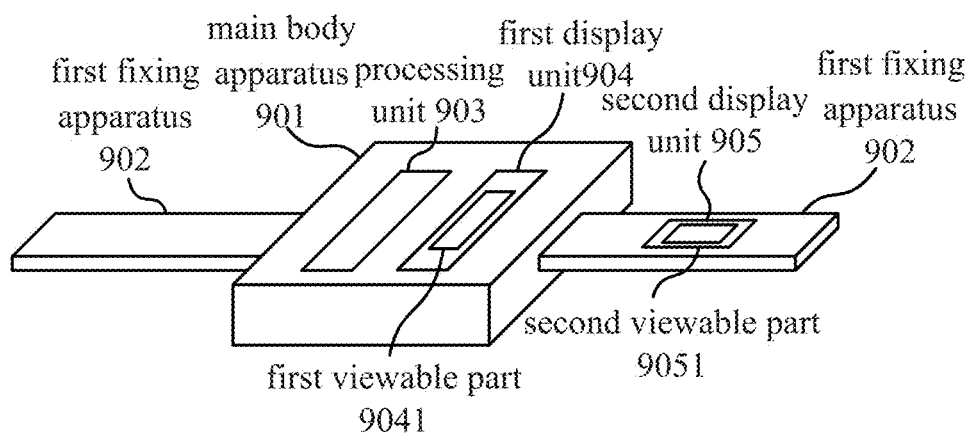

FIGS. 9A-9C are structural diagrams showing an electronic device according to an embodiment of the present disclosure. As shown in FIGS. 9A-9C, the electronic device 900 according to the embodiment of the present disclosure includes a main body apparatus 901 and a fixing apparatus 902. The fixing apparatus 902 is connected with the main body apparatus 901, which maintains a relative location relationship between the electronic device 900 and the user. In the following, a first configuration example to a fourth configuration example of the fixing apparatus 902 will be further described with reference to FIGS. 10A-10D. In FIGS. 10A-10D, for the convenience of the description, only the main body apparatus 901 and the first fixing apparatus 902 in the electronic device 900 are shown.

Figure 10A:
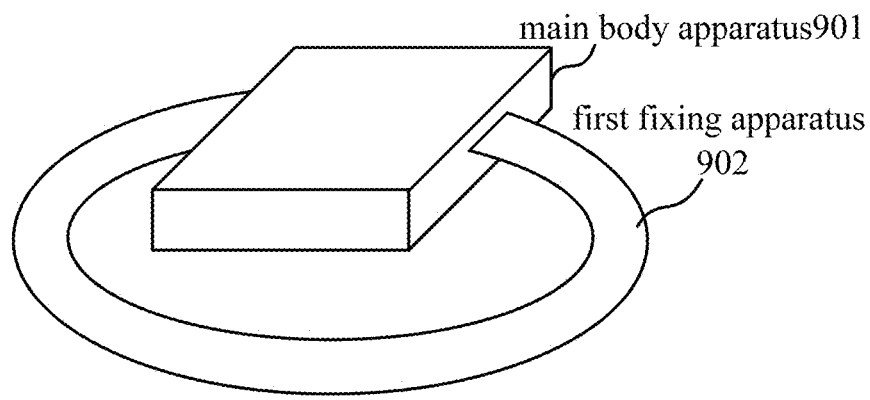
FIGS. 10A-10D are structural diagrams showing a first configuration example to a fourth configuration example of a fixing apparatus in the electronic device according to the embodiment of the present disclosure, respectively.
Figure 10B:
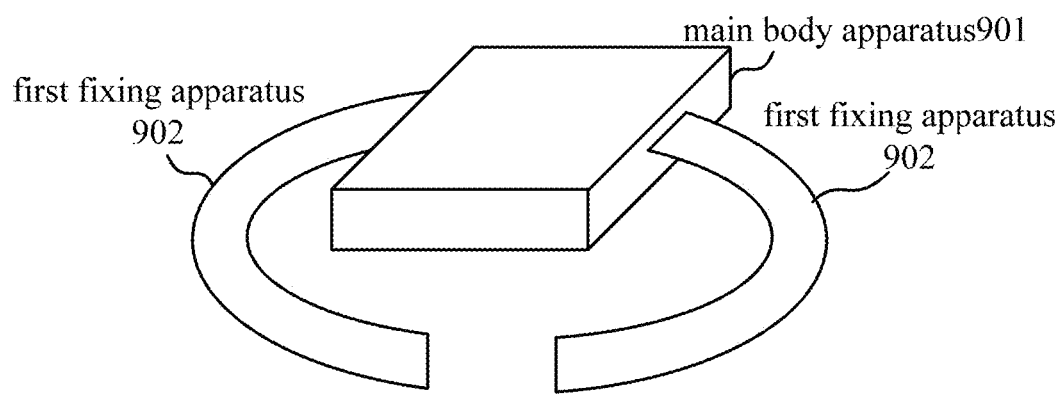

Particularly, FIGS. 10A and 10B show two fixed state of connection between the main body apparatus 901 and the fixing apparatus 902, respectively. In the first fixed state as shown in FIG. 10A, the fixing apparatus 902 and the main body apparatus 901 form a closed-loop annular space, wherein the fixing apparatus 902 and the main body apparatus 901 form a part of the annular space, respectively. In the second fixed state as shown in FIG. 10B, the fixing apparatus 902 and the main body apparatus 901 form an approximate annular space with a small opening, wherein the fixing apparatus 902 and the main body apparatus 901 form a part of the annular space, respectively. In an embodiment of the present disclosure, the main body apparatus 901 is a dial section of the smart watch, and the fixing apparatus 902 is a watchband section of the smart watch. The annular space or the approximate annular space formed by the main body apparatus 901 and the fixing apparatus 902 can surround a wrist (as the cylinder) of a user of the smart watch, and the diameter of the annular space or the approximate annular space is larger than the diameter of the wrist of the user and smaller than the diameter of the first of the user.

Figure 10C:
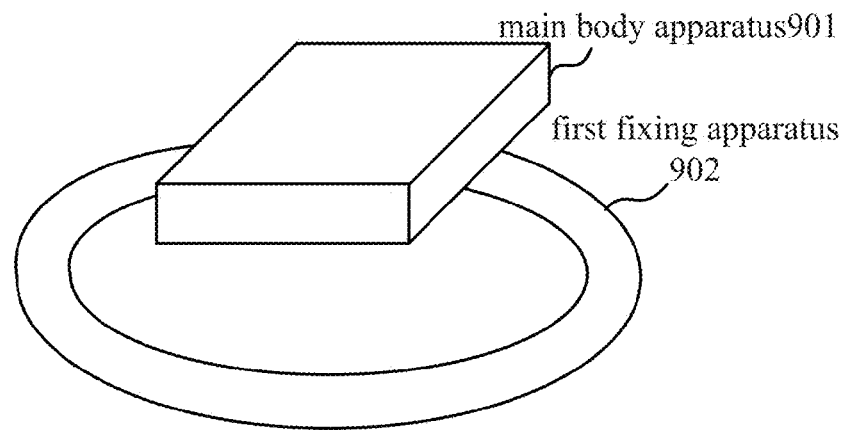
Figure 10D:
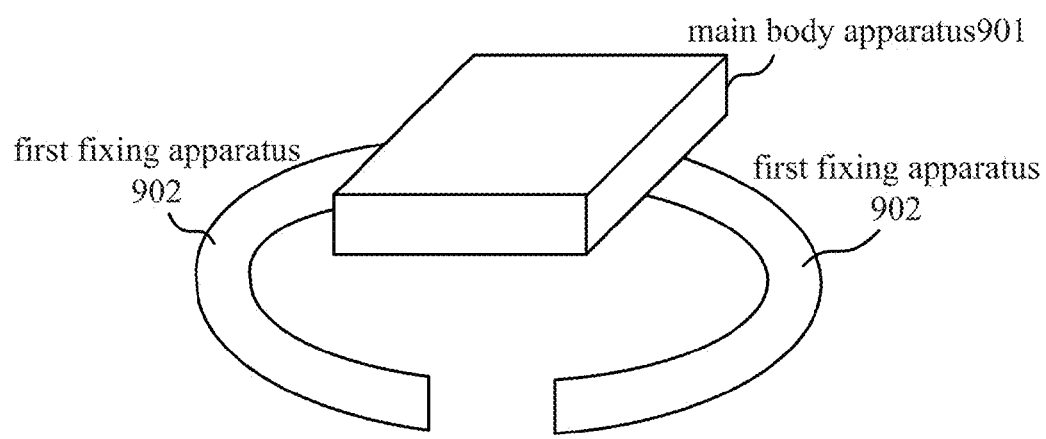

Also, of course, the annular space or the approximate annular space may be formed by the fixing apparatus 902 alone. As shown in FIGS. 10C and 10D, the main body apparatus 901 may be arranged on the fixing apparatus 902 (i.e., the main body apparatus 901 is attached to the fixing apparatus 902 by contact with its surface), so that only the fixing apparatus 902 itself forms the annular space (FIG. 10C) or the approximate annular space (FIG. 10D) surrounding the cylinder from the outside. The fixing apparatus 902 is arranged with a fixing structure such as an agraffe, a snap fastener or a slide fastener, etc. (not shown).

Back to FIGS. 9A-9C, the configuration of the electronic device 900 will be further described.

Particularly, as shown in FIGS. 9A-9C, the main body apparatus 901 is arranged with a processing unit 903, a first display unit 904 and a second display unit 905 thereon. The processing unit 903 is used to generate an image to be displayed and perform display control. The first display unit 904 and the second display unit 905 are used to output the first image and the second image respectively. More particularly, a first viewable part 9041 of the first display unit 904 and a second viewable part 9051 of the second display unit 905 are arranged on the main body apparatus 901 (as shown in FIG. 9A), or the first viewable part 9041 and the second viewable part 9051 are arranged on the fixing apparatus 902 (FIG. 9B), or one of the first viewable part 9041 and the second viewable part 9051 is arranged on the main body apparatus 901 and the other one of the first viewable part 9041 and the second viewable part 9051 is arranged on the fixing apparatus 902 (as shown in FIG. 9C). The first viewable part 9041 and the second viewable part 9051 are viewable parts in the first display unit 904 and the second display unit 905 which are viewed by the user so that the user is aware of the display content. That is, as described in the following, the first display unit 904 and the second display unit 905 include multiple components depending on the principle, wherein the first viewable part 9041 and the second viewable part 9051 are the region in which the user views the image content practically.

The first display unit 904 and the second display unit 905 are optionally display units following different display principles. The first display unit 904 adopts the near-to-eye optical display system. The second display unit 905 includes, but not limited to, a liquid crystal display (LCD) unit, an organic electro-luminescence display unit, an organic light emitting diode (OLED) display unit, or an E Ink type display unit, etc.

In the following, different configuration examples of the first viewable part and the second viewable part will be described with reference to FIGS. 11A-13B.

Figure 11A:
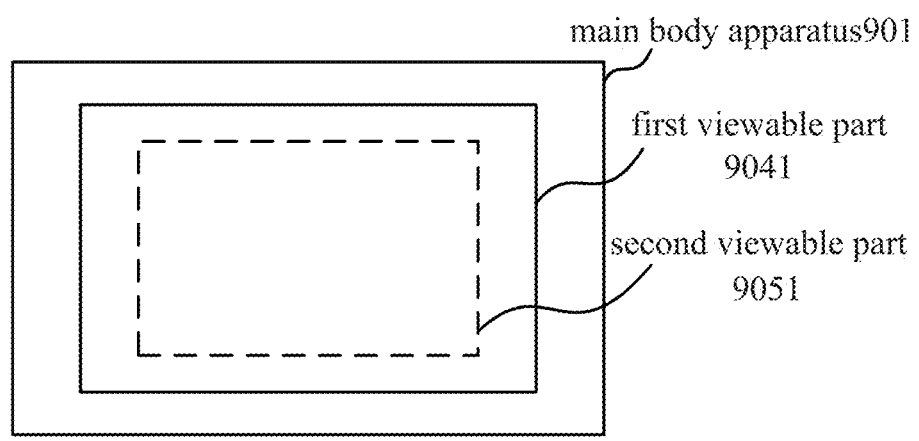
FIGS. 11A and 11B are a vertical view and a side view of a first configuration example of a viewable part of the electronic device according to an embodiment of the present disclosure, respectively.
Figure 11B:
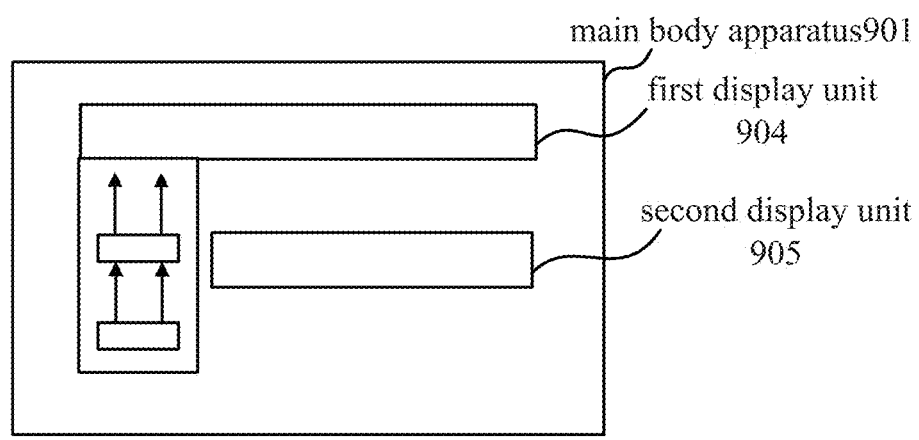

FIGS. 11A and 11B are a vertical view and a side view showing a first configuration example of a viewable part of the electronic device according to the embodiment of the present disclosure, respectively.

As shown in FIG. 11A, the first viewable part 9041 and the second viewable part 9051 have a first configuration example in which they are arranged on the main body apparatus 901 overlapped with each other. The present disclosure is not limited thereto, and the first viewable part 9041 and the second viewable part 9051 may be arranged on the fixing apparatus 902 overlapped with each other.

FIG. 11B further shows a side view of the first configuration example of the first viewable part 9041 and the second viewable part 9051 overlapped with each other. As shown in FIG. 11B, the first display unit 904 configured with the first viewable part 9041 and the second display unit 905 configured with the second viewable part 9051 are configured as shown in FIG. 11B, so that the transmittance of at least the viewable parts at the outer side of the annular space or the approximate annular space in the first viewable part 9041 and the second viewable part 9051 meets a predetermined condition in an outward direction of the annular space or the approximate annular space. The predetermined condition may be that the transmittance is larger than or equal to a predetermined value, such as 70%. In the example shown in FIGS. 11A and 11B, the first viewable part 9041 is at the outer side. The present disclosure is not limited thereto, and the second viewable part 9051 may be at the outer side. By making the transmittance of the first viewable part 9041 larger than or equal to the predetermined value, the display function of the second viewable part 9051 is not affected by the first viewable part 9041; thereby a more compact configuration may be achieved.

Figure 12A:
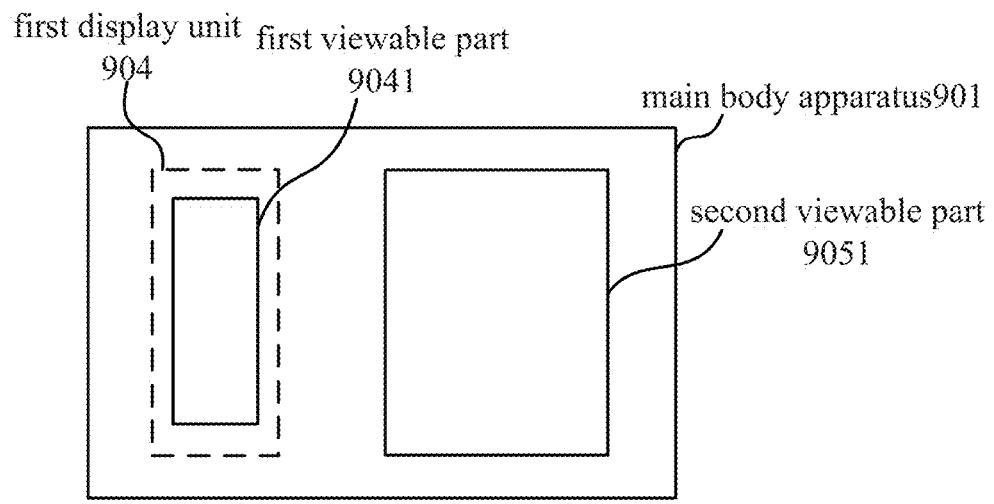
FIGS. 12A and 12B are a vertical view and a side view of a second configuration example of a viewable part of the electronic device according to an embodiment of the present disclosure, respectively.
Figure 12B:
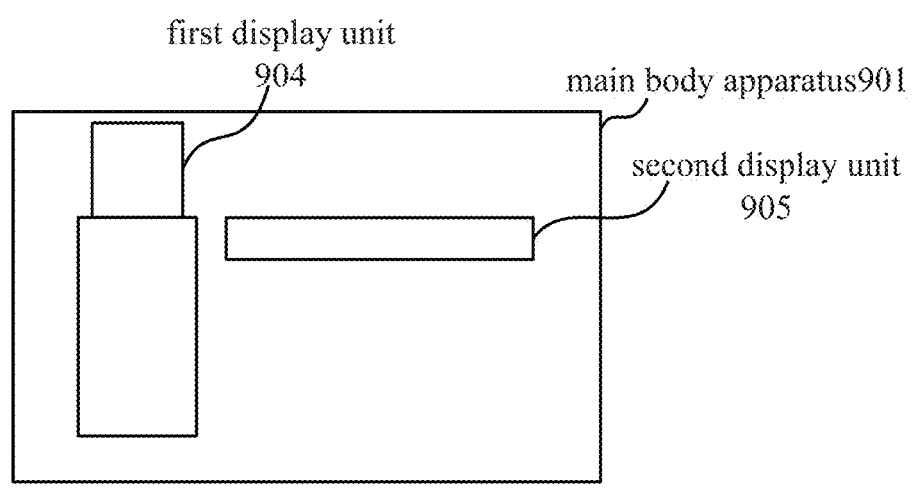

FIGS. 12A and 12B are a vertical view and a side view showing a second configuration example of a viewable part of the electronic device according to the embodiment of the present disclosure, respectively.

As shown in FIG. 12A, the first viewable part 9041 and the second viewable part 9051 have a second configuration example in which they are arranged on the fixing apparatus 902 or the main body apparatus 901 adjacently with each other. In FIGS. 12A and 12B, the first viewable part 9041 and the second viewable part 9051 are arranged in the main body apparatus 901 adjacently. The present disclosure is not limited thereto, and the first viewable part 9041 and the second viewable part 9051 may be at the main body apparatus 901 and the fixing apparatus 902, respectively, and the distance between the first viewable part 9041 and the second viewable part 9051 is smaller than a threshold such as 1 cm.

FIG. 12B further shows a side view of the second configuration example of the first viewable part 9041 and the second viewable part 9051 adjacently with each other. As shown in FIG. 12B, the first display unit 904 configured with the first viewable part 9041 and the second display unit 905 configured with the second viewable part 9051 are arranged adjacently as shown in FIG. 12B, and the display direction of the first viewable part 9041 and the second viewable part 9051 is the outward direction of the annular space or the approximate annular space.

Figure 13A:
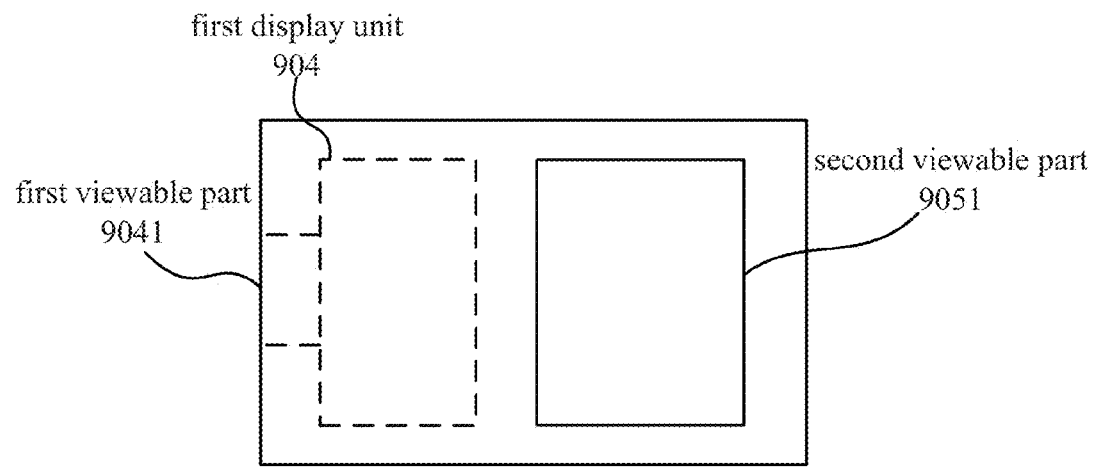
FIGS. 13A and 13B are a vertical view and a side view of a third configuration example of a viewable part of the electronic device according to an embodiment of the present disclosure, respectively.
Figure 13B:
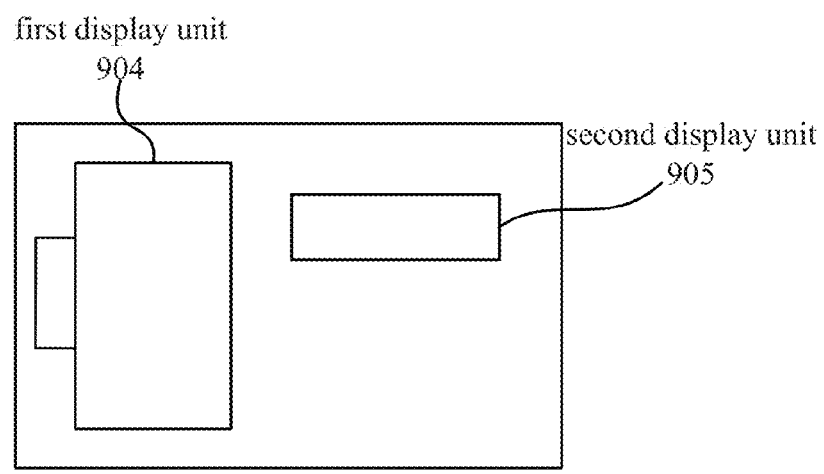

FIGS. 13A and 13B are a vertical view and a side view showing a third configuration example of a viewable part of the electronic device according to the embodiment of the present disclosure, respectively.

As shown in FIG. 13A, the first viewable part 9041 and the second viewable part 9051 has a third configuration example in which they are arranged on the main body apparatus 901 or the fixing apparatus 902 adjacently with each other. Different from the second configuration example shown in FIGS. 12A and 12B, as shown in FIG. 13B, the display direction of one of the first viewable part 9041 and the second viewable part 9051 is the outward direction of the annular space or the approximate annular space, and the display direction of the other one of the first viewable part 9041 and the second viewable part 9051 is a direction vertical to the outward direction of the annular space or the approximate annular space.

Further, the switch between the overlapped state and the non-overlapped state of the first viewable part 9041 and the second viewable part 9051 will be described with reference to FIGS. 14A-14D.

FIGS. 14A-14D are schematic diagrams showing a first to fourth example of the moving state of the viewable parts of the electronic device according to the embodiment of the present disclosure, respectively. For the convenience of description, the description is made taking the case in which the first viewable part 9041 and the second viewable part 9051 are arranged on the main body apparatus 901 as an example. It is easily understood that the present disclosure is not limited thereto, and the first viewable part 9041 and the second viewable part 9051 may also both be arranged in the fixing apparatus 902. The main body apparatus 901 further comprises a first sub unit 1401 and a second sub unit 1402, one of the first viewable part 9041 and the second viewable part 9051 is arranged on the first sub unit 1401, the other one of the first viewable part 9041 and the second viewable part 9051 is arranged on the second sub unit 1402, and the first sub unit 1401 and the second sub unit 1402 are connected via a connecting unit, so that the first viewable part 9041 and the second viewable part 9051 are switched between the first state and a third state in which they are not arranged overlapped with each other.

Figure 14A:
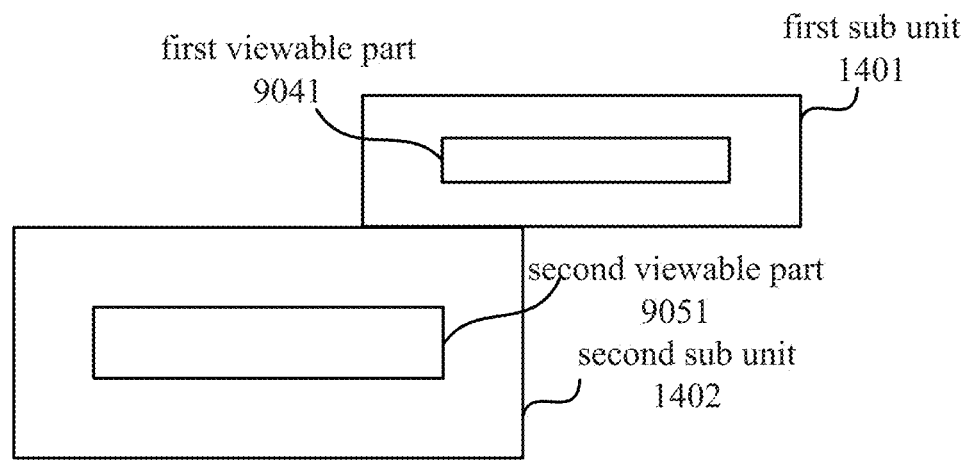
FIGS. 14A to 14D are schematic diagrams showing a moving state of the viewable part in the electronic device according to an embodiment of the present disclosure, respectively.

Particularly, as shown in FIG. 14A, the first sub unit 1401 and the second sub unit 1402 are connected via a slide way component (not shown) as the connecting unit. The first viewable part 9041 is arranged in the first sub unit 1401, and the second viewable part 9051 is arranged in the second sub unit 1402. When the first sub unit 1401 and the second sub unit 1402 slide away from each other, the first viewable part 9041 and the second viewable part 9051 may display at the same time or may display independently. Also, it may be set that the sliding of the first sub unit 1401 with respect to the second sub unit 1402 generates the control signal controlling the display or powering off of the second viewable part 9051. Also, when the first sub unit 1401 slides to a third state with respect to the second sub unit 1402, the transmittance of the first viewable part 9041 in the outwards direction of the annular space or the approximate annular space meets a predetermined condition. In this way, the user may observe his/her skin through the electronic device 900, as if no first viewable part 9041 is arranged.

Figure 14B:
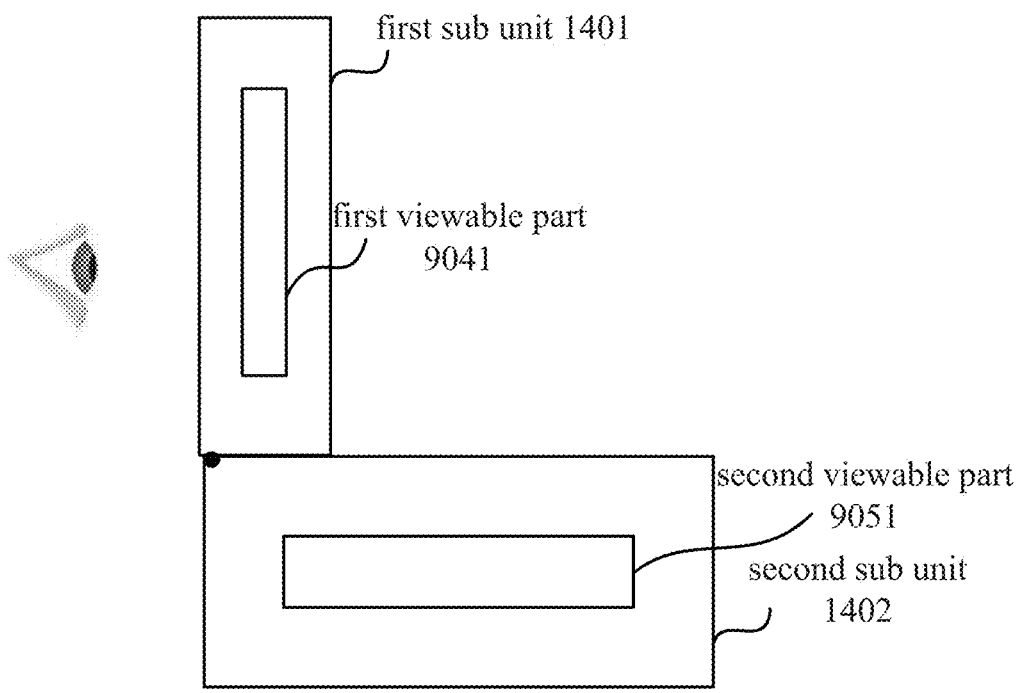
Figure 14C:
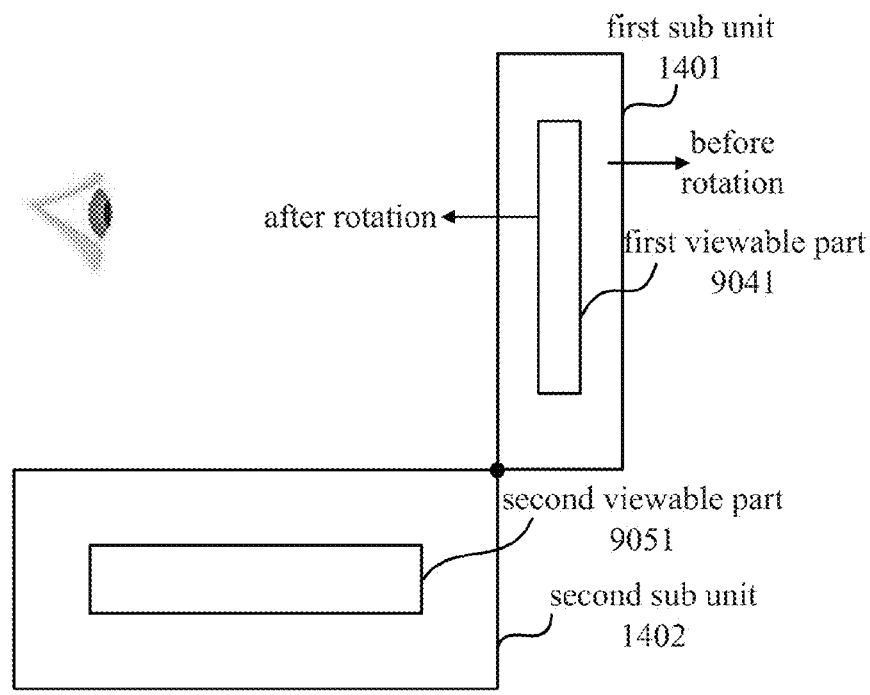
Figure 14D:
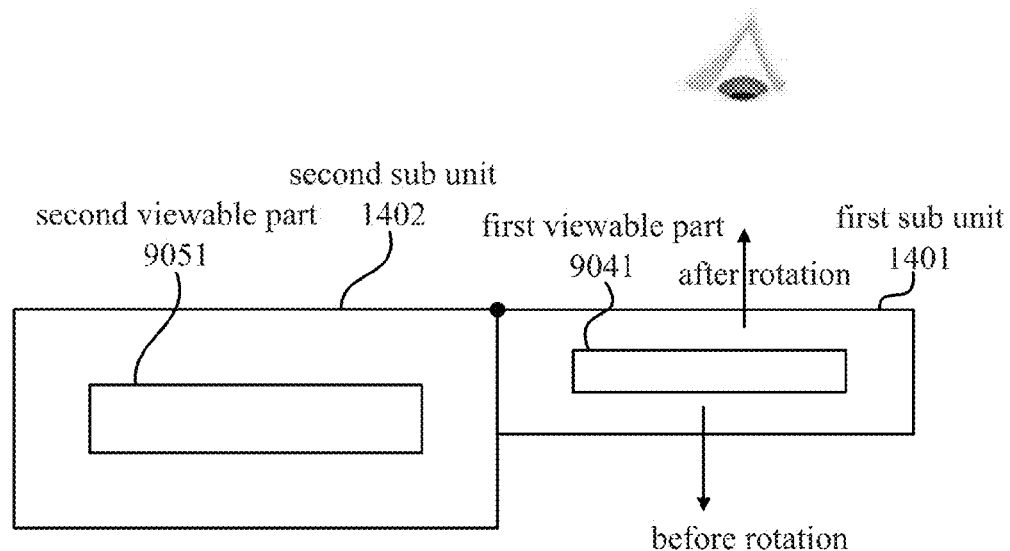

As shown in FIGS. 14B-14D, the first sub unit 1401 and the second sub unit 1402 are connected via a pivot component as the connecting unit. The first viewable part 9041 is arranged in the first sub unit 1401, and the second viewable part 9051 is arranged in the second sub unit 1402. When the first sub unit 1401 is rotated with respect to the second sub unit 1402, the first viewable part 9041 and the second viewable part 9051 may display at the same time or display independently. Also, it may be set that the rotating of the first sub unit 1401 with respect to the second sub unit 1402 generates the control signal controlling the display or powering off of the second viewable part 9051.

It is to be noted that as shown in FIGS. 14A and 14B, when the first sub unit 1401 slides or rotates to switch from the first state to the third state, the display direction of the first viewable part 9041 does not change, and the user may continue to see the display of the first viewable part 9041 in the original display direction.

However, as shown in FIGS. 14C and 14D, when the first sub unit 1401 rotates to switch from the first state to the third state, the first sub unit 1401 needs to be further configured, so that the user may view the display of the first viewable part 9041 in the same direction in both the first state and the third state, thereby further improving the convenience of the user. Therefore, in an embodiment of the present disclosure, the first sub unit 1401 may be configured to turn itself over, i.e., turn over 180 degrees when the first sub unit 1401 rotates with respect to the second sub unit 1402, so that the first viewable part 9041 turned over to the back side turns back to the original display direction again. That is, the display direction of the first viewable part 9041 remains unchanged after rotation.

Also, in another embodiment of the present disclosure, the first display unit 904 may be configured to be capable of performing bidirectional display by a light path selection unit or an optical switching unit. Particularly, in the light path of the first display unit 104 shown in FIGS. 4A-4C, a beam splitting device is arranged, so that the light beam for forming the magnified virtual image is guided to two display directions arranged opposite to each other in the first display unit 104 respectively. Also, a light path switching device such as a mirror may be arranged in the light path of the first display unit 104 shown in FIGS. 4A-4C, so that the light path switching device is rotated when necessary to guide the light beam for forming the magnified virtual image to two display directions arranged opposite to each other in the first display unit 104. That is, when the first sub unit 1401 is rotated with respect to the second sub unit 1402, the display direction of the first viewable part 9041 of the first display unit 104 switches bidirectionally by the above beam splitting device or the light path switching device in response to the rotation, so that the display direction of the first viewable part 9041 remains unchanged to the user after the rotation.

Figure 15:
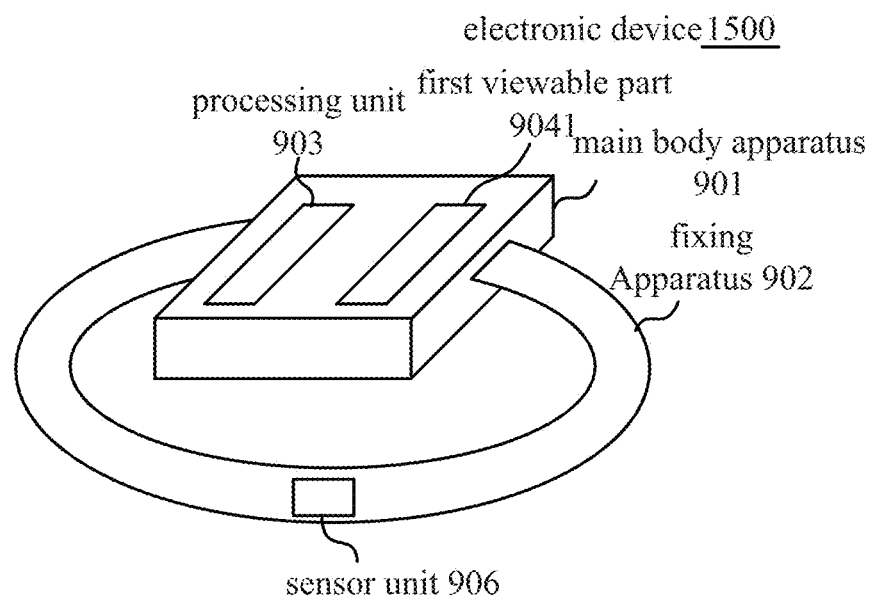
FIG. 15 is a structural diagram showing an electronic device according to another embodiment of the present disclosure.

FIG. 15 is a structural diagram showing an electronic device according to another embodiment of the present disclosure. Compared to the electronic device 900 according to the embodiment of the present disclosure described with reference to FIGS. 9A-9C, the electronic device 1500 according to the embodiment of the present disclosure shown in FIG. 15 further includes a sensor unit 906. As shown in FIG. 15, the sensor unit 906 is arranged on the fixing apparatus 902. However, the sensor unit 906 may be arranged on the main body apparatus 901 as well. Further, for simplifying the description, only the first viewable part 9041 is shown in the electronic device 1500 shown in FIG. 15. It is easily understood that the electronic device 1500 can of course include the second viewable part 9051 or more viewable parts.

Particularly, the processing unit 903 determines the display of the first viewable part 9041 based on the signal acquired by the sensor unit 906. In an embodiment of the present disclosure, the sensor unit 906 may be an image capturing unit. The image capturing direction of the sensor unit 906 is opposite to an image output direction of the first viewable part 9041 in the radial direction of the annular space or the approximate annular space. In this way, when the real scene image captured by the sensor unit 906 is displayed on the first viewable part 9041, since the capturing direction of the sensor unit 906 is consistent with the watching direction of the user eye, the user may see an image as if it is perspective through the electronic device 1500 through the first viewable part 9041.

Also, in another embodiment of the present disclosure, the sensor unit 906 may be an image capturing unit and the image captured by the image capturing unit is analyzed, so that the identifying result acquired by the analysis is displayed by the first viewable part 9041.

Also, in another embodiment of the present disclosure, the sensor unit 906 may be a GPS location unit, and the map as well as the corresponding navigation information may be displayed by the first viewable part 9041 based on the location of the GPS location unit.

Also, in another embodiment of the present disclosure, the sensor unit 906 may be a sensing device such as a gyro, and the reference direction of the sensor unit 906 is correlated with the viewable direction of the first viewable part 9041. Thereby, the display of the first viewable part 9041 may be adjusted according to the movement of the electronic device 1500 sensed by the sensor unit 906. Particularly, when the structure of the main body apparatus 901 (the dial section) of the electronic device 1500 (such as the smart watch) is not a shape change structure, since the main body apparatus 901 (the dial section) being watched at this time is vertical to the horizontal plane, the gravity direction set in the sensor unit 906 is the direction pointing to 12 o'clock from the center in the dial section. When the shape of the main body apparatus 901 (the dial section) of the electronic device 1500 (such as the smart watch) is changeable (as shown in FIGS. 14B-14D), since the main body apparatus 901 (the dial section) being watched at this time is horizontally placed, the gravity direction set in the sensor unit 906 is vertically up to the dial surface.

The electronic device according to the embodiment of the present disclosure has been described with reference to FIGS. 9-15. In the following, the display method used by the electronic device will be described with reference to FIG. 16.

Figure 16:
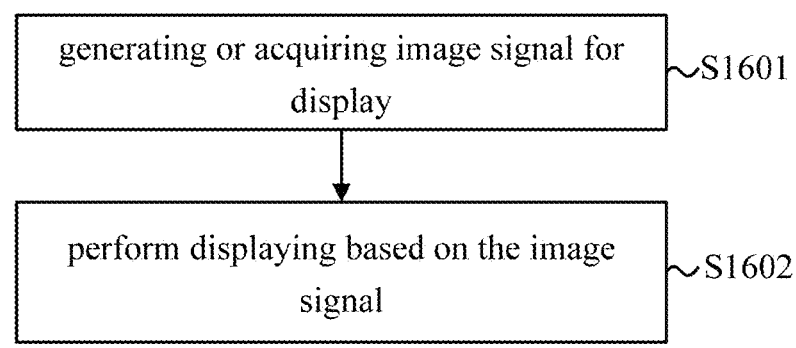
FIG. 16 is a flowchart showing a display method according to an embodiment of the present disclosure.

FIG. 16 is a flowchart showing the display method according to an embodiment of the present disclosure. The display method shown in FIG. 16 is applied to the electronic device shown in FIG. 9. As described above, the electronic device includes a main body apparatus having a processing unit which generates an image to be displayed and performs display control; a fixing apparatus connected with the main body apparatus, which maintains a relative location relationship with the user of the electronic device; and a first display unit and a second display unit, which outputs a first image and a second image respectively, wherein a first viewable part of the first display unit and a second viewable part of the second display unit are arranged on the main body apparatus; or the first viewable part and the second viewable part are arranged on the fixing apparatus; or one of the first viewable part and the second viewable part is arranged on the main body apparatus and the other one of the first viewable part and the second viewable part is arranged on the fixing apparatus; the viewable part is a part in the display unit which is viewed by the user so that the user is aware of the display content, the first display unit and the second display unit are display units following different display principles.

The display method includes generating or acquiring an image signal for display (step S1601); and performing display based on the image signal (step S1602).

In the step S1601, the processing unit 903 of the electronic device 900 may generate an image signal for display. Also, the electronic device 900 may acquire the image signal for display from the server or another electronic device through a communication unit. Then, the process goes to the step S1602. In the step S1602, the display unit of the electronic device 900 performs displaying based on the image generated or acquired in the step S1601. Particularly, as described above, the step of performing displaying may include displaying a magnified virtual image corresponding to the image signal through the display unit including the display component and the optical component. Also, the step of performing displaying may further include generating a display control signal based on the signal acquired by the sensor to control the on/off of the display of the image signal, etc. Further, the step of performing displaying may further include displaying a magnified 3D virtual image corresponding to the image signal through two display units including the display component and the optical component.

(Third Implementation)

The overall structural configuration of the electronic device 100 according to the first embodiment of the present disclosure has been described above with reference to FIG. 1-2D, and the principle of the first display unit 104 adopted by the electronic device 100 has been described with reference to FIGS. 3A-4C. As described above, the electronic device 100 according to the embodiment of the present disclosure may have many usage patterns, such as a smart watch pattern and a smart glass pattern etc. Also, the first display unit 104 in the electronic device 100 is designed to be configured on the main body apparatus 101 or the fixing apparatus 102, even across the main body apparatus 101 and the fixing apparatus 102, according to different usage patterns and scenes. In order to realize the electronic device 100 with multiple modes and patterns, it is necessary to provide the first display unit 104 with a more flexible optical path design.

Figure 17A:
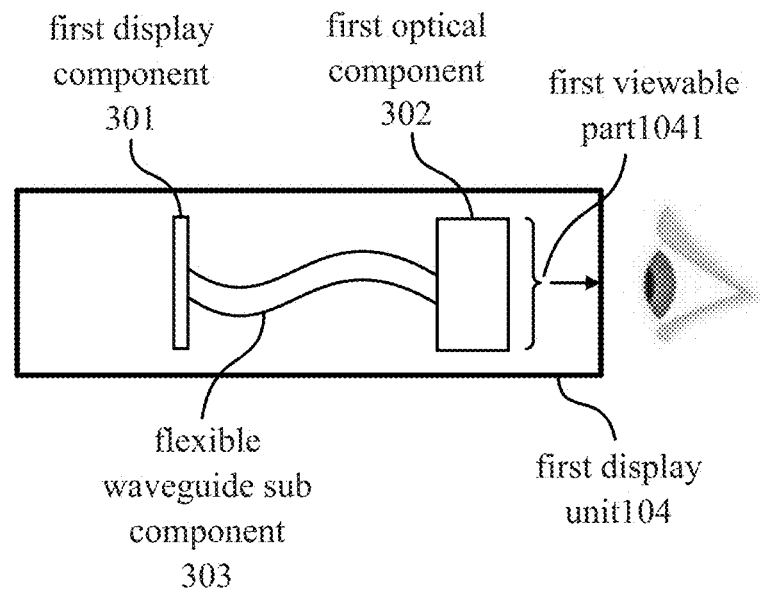
FIGS. 17A-17C are schematic diagrams showing the first display unit in the electronic device according to a sixth embodiment of the present disclosure.
Figure 17B:
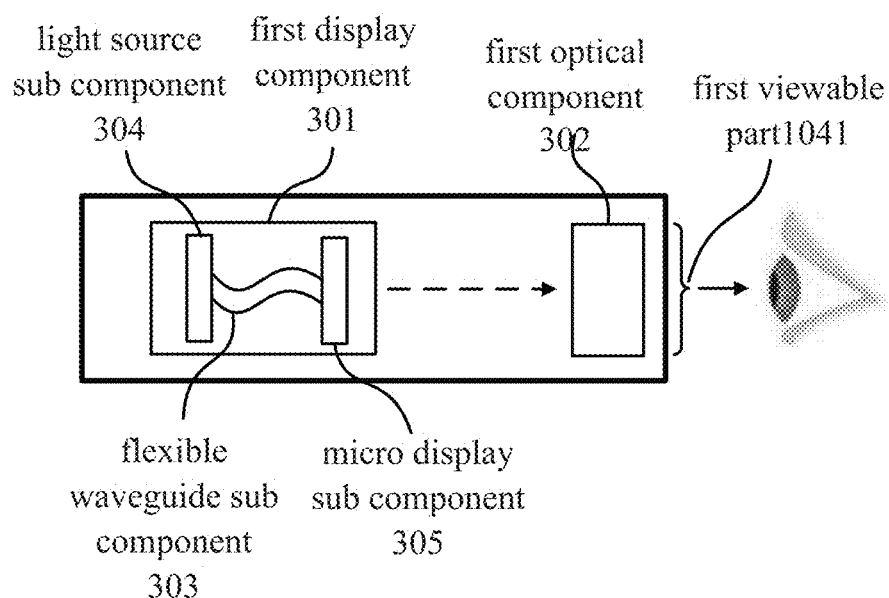
Figure 17C:
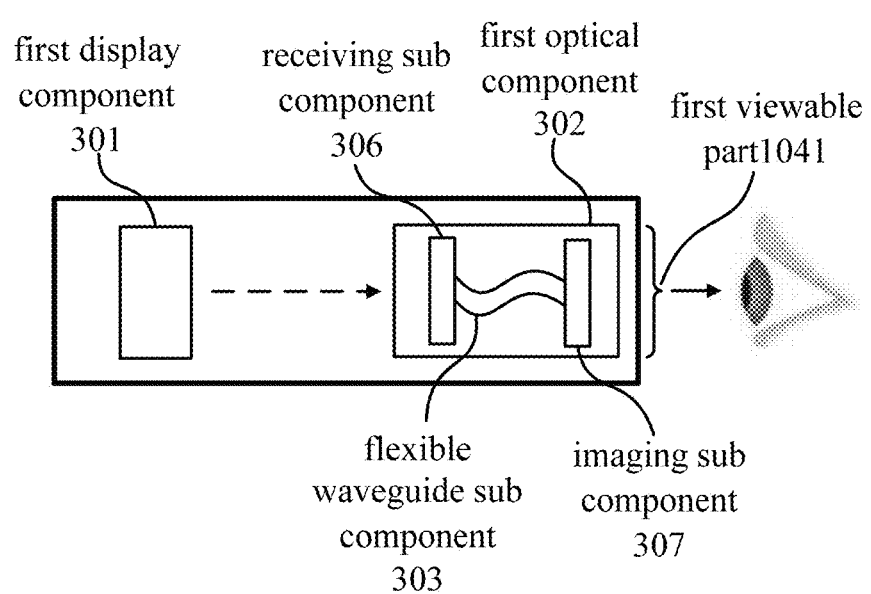

FIGS. 17A-17C are schematic diagrams showing a first display unit in the electronic device according to a sixth embodiment of the present disclosure. Compared to the first display unit in the electronic device according to the first embodiment of the present disclosure described with reference to FIGS. 3A-3C, the first display unit 104 in the electronic device according to the sixth embodiment of the present disclosure further includes a flexible waveguide sub component 303 except for the first display component 301 and the first optical component 302.

Particularly, as shown in FIG. 17A, the flexible waveguide sub component 303 is arranged between the first display component 301 and the first optical component 302, and is used to guild the light corresponding to the first image to the first optical component 302. Also, as shown in FIGS. 17B and 17C, the flexible waveguide sub component 303 may also be arranged in the first display component 301 (FIG. 17B) or the first optical component (FIG. 17C).

In FIG. 17A, the flexible waveguide sub component 303 guilds the light corresponding to the first image emitted by the first display component 301 to the first optical component 302, so that the first optical component 302 forms a magnified virtual image corresponding to the first image. Therefore, due to the flexible attribute of the flexible waveguide sub component 303, it can adapt to different design requirement, providing a bending or extension of the internal optical path of the electronic device 100. In this way, the first display component 301 and the first optical component 302 in the first display unit 104 may be arranged separately. That is, the first display component 301 may be arranged in the main body apparatus 101, and the first optical component 302 may be arranged in the fixing apparatus 102, vice versa.

In FIG. 17B, the first display component 301 further includes a light source sub component 304 for emitting imaging illumination light of the first image and a micro display sub component 305 for displaying the first image. The flexible waveguide sub component 303 is arranged between the light source sub component 304 and the micro display sub component 305, to guild the light emitted by the light source sub component 304 to the micro display sub component 305. In this way, the light source sub component 304 and the micro display sub component 305 may be arranged separately. That is, the light source sub component 304 may be arranged in the main body apparatus 101, and the micro display sub component 305 may be arranged in the fixing apparatus 102, vice versa.

In FIG. 17C, the first optical component 302 includes a receiving sub component 306 for receiving the light corresponding to the first image and an imaging sub component 307 for forming a magnified virtual image corresponding to the first image, and the flexible waveguide sub component 303 is arranged between the receiving sub component 306 and the imaging sub component 307, to guild the light corresponding to the first image to the imaging sub component 307. In this way, the receiving sub component 306 and the imaging sub component 307 may be arranged separately. That is, the receiving sub component 306 may be arranged in the main body apparatus 101, and the imaging sub component 307 may be arranged in the fixing apparatus 102, vice versa.

As described above, the flexible waveguide sub component 303 arranged in the first display component 301 is used to guild light before the first image is formed, the flexible waveguide sub component 303 arranged between the first display component 301 and the first optical component 302 or arranged in the first optical component 302 is used to guild the light corresponding to the first image after the first image is formed.

The first display unit 104 in the electronic device according to the sixth embodiment of the present disclosure realizes the bending or extension of the internal optical path by the flexible waveguide sub component 303 configured therein, so that the first display unit 104 may be configured across both the main body apparatus 101 and the fixing apparatus 102. That is, the first display component 301 and the first optical component 302 in the first display unit 104 are configured on the main body apparatus 101 and the fixing apparatus 102 respectively, or the light source sub component 304 and the micro display sub component 305 in the first display component 301 are configured on the main body apparatus 101 and the fixing apparatus 102 respectively, or the receiving sub component 306 and the imaging sub component 307 in the first optical component 302 are configured on the main body apparatus 101 and the fixing apparatus 102 respectively. In this way, the flexible waveguide sub component 303 is almost not limited by any physical shape; therefore, the first display unit 104 in the electronic device according to the embodiment of the present disclosure may configure the internal optical path flexibly to adapt to different practical usage patterns and requirements.

In the following, the usage pattern of the electronic device according to the sixth embodiment of the present disclosure will be further described with reference to FIGS. 18A and 18B.

Figure 18A:
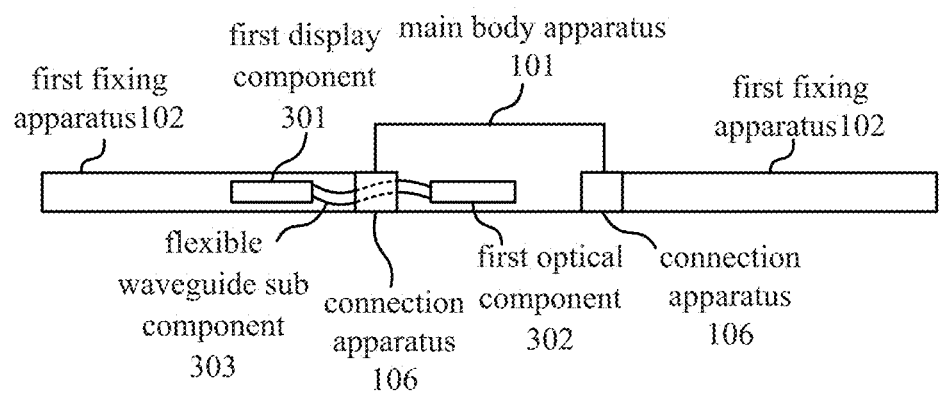
FIGS. 18A and 18B are schematic diagrams showing a usage state of the electronic device according to the sixth embodiment of the present disclosure.
Figure 18B:
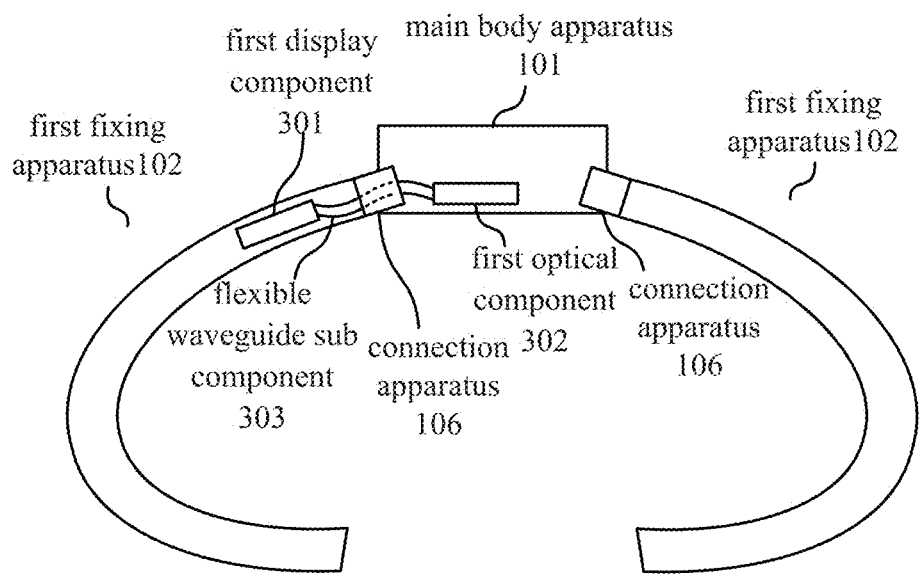

FIGS. 18A and 18B are schematic diagrams showing the usage pattern of the electronic device according to the sixth embodiment of the present disclosure. As shown in FIGS. 18A and 18B, in the electronic device according to the sixth embodiment of the present disclosure, the first display unit 104 is configured across the main body apparatus 101 and the fixing apparatus 102. Particularly, the first display component 301 in the first display unit 104 is configured in the fixing apparatus 102, and the first optical component 302 is configured in the main body apparatus 101. As described above, the electronic device according to the embodiment of the present disclosure is not limited thereto, and the first display component 301 may also be configured in the main body apparatus 101 and the first optical component 302 may also be configured in the fixing apparatus 102. Alternatively, the first display component 301 or the first optical component 302 itself may be configured across the main body apparatus 101 and the fixing apparatus 102. In the following, the description will be made taking the case in FIGS. 18A and 18B as an example.

The electronic device shown in FIGS. 18A and 18B further includes a connection apparatus 106 except for the main body apparatus 101 and the fixing apparatus 102. The main body apparatus 101 and the fixing apparatus 102 are connected through the connection apparatus 106. Also, the main body apparatus 101 and the fixing apparatus 102 are capable of moving with respect to each other. Particularly, in a first usage pattern shown in FIG. 18A (non-wearing state), the main body apparatus 101 and the fixing apparatus 102 connected through the connection apparatus 106 are almost at the same plane. In a second usage pattern shown in FIG. 18B (wearing state), the main body apparatus 101 and the fixing apparatus 102 connected through the connection apparatus 106 move with respect to each other, and are at a different location and angle from those in the first usage pattern.

Further, in the electronic device shown in FIGS. 18A and 18B, the flexible waveguide sub component 303 is arranged correspondingly to the connection apparatus 106, so that the flexible waveguide sub component 303 can be used to guild and deliver light when the main body apparatus 101 and the fixing apparatus 102 are at different relative locations. Particularly, in the cases shown in FIGS. 18A and 18B, the corresponding arrangement of the flexible waveguide sub component 303 and the connection apparatus 106 means that the flexible waveguide sub component 303 traverses through the inside of the connection apparatus 106. Of course, the electronic device according to the embodiment of the present disclosure is not limited thereto. The flexible waveguide sub component 303 may be independent from the connection apparatus 106 and is fit with the connection apparatus 106, so that they are packed by another package.

In the current wearable electronic device without the configuration of the flexible waveguide sub component, no matter the main body apparatus and the fixing apparatus of the electronic device are connected through the connection apparatus or connected directly, when a display unit such as the first display unit 104 needs to be configured, the display related component in the display unit needs to be configured in a rigid surface and its extended plane of the main body apparatus or the fixing apparatus, resulting in that the physical size of the display related component that can be housed is very limited, or resulting in an unnecessary increase of the plane for housing the display related component, thereby the display effect or the wearing experience is limited.

The electronic device according to the embodiment of the present disclosure solves the above technical problem due to the configuration of the flexible waveguide sub component 303. It is easy to be understood that the electronic device according to the embodiment of the present disclosure is not limited to the example described with reference to FIGS. 18A and 18B. For example, the electronic device according to another embodiment of the present disclosure may not be configured with the connection apparatus 106, and the main body apparatus 101 and the fixing apparatus 102 are connected directly. No matter whether the connection apparatus 106 is configured or not, since the first display unit 104 is configured with the flexible waveguide sub component 303, the individual components of the first display unit 104 can be configured in the main body apparatus 101 or the fixing apparatus 102 according to design requirement, or across the main body apparatus 101 and the fixing apparatus 102. The flexible attribute of the flexible waveguide sub component 303 enables it to adapt to the shape of the electronic device of different usage objects, without limit the display related component in a single rigid plane.

Figure 19A:
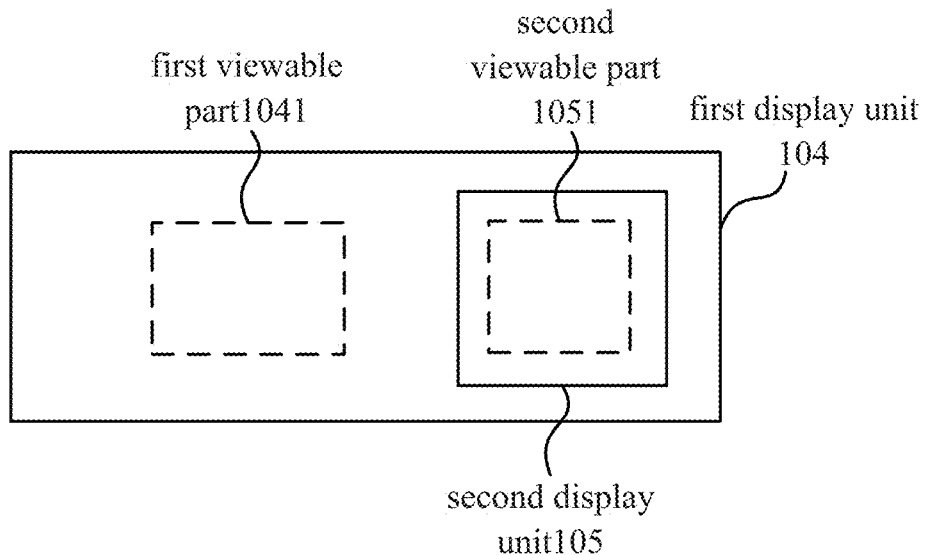
FIGS. 19A and 19B are schematic diagrams showing a configuration of a display unit in the electronic device according to a seventh embodiment of the present disclosure.
Figure 19B:
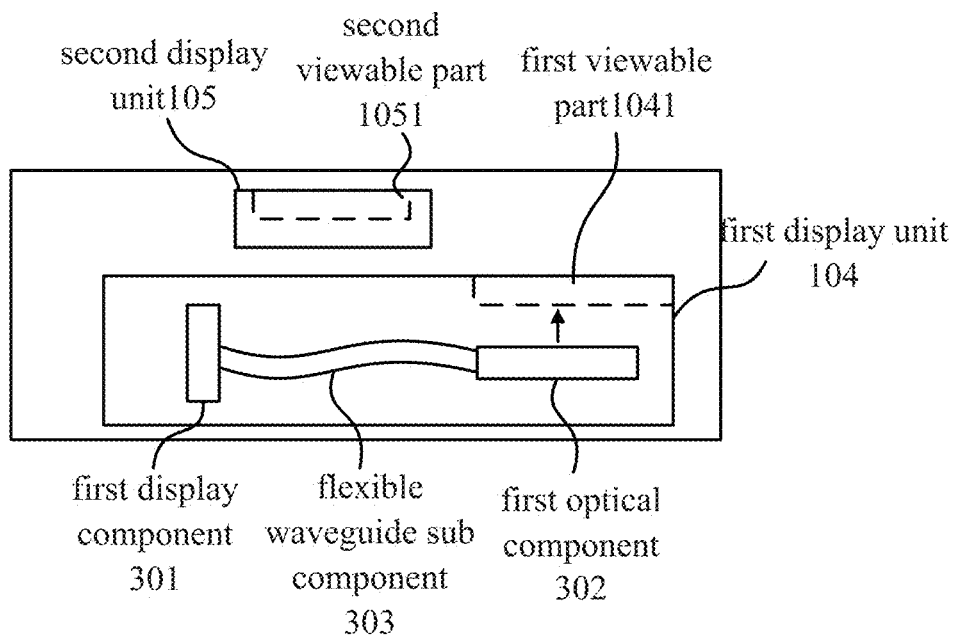

FIGS. 19A and 19B are schematic diagrams showing a configuration of a display unit in an electronic device according to a seventh embodiment of the present disclosure. The electronic device according to the seventh embodiment of the present disclosure includes the first display unit 104 and the second display unit 105. As shown in FIGS. 19A and 19B, the first display unit 104 and the second display unit 105 may be configured partly overlapped with each other. It is to be understood that FIGS. 19A and 19B only show the relative configuration of the first display unit 104 and the second display unit 105 in the electronic device according to the embodiment of the present disclosure, and the main body apparatus 101 and the fixing apparatus 102 are omitted. The first display unit 104 and the second display unit 105 may be arranged on the main body apparatus 101 and the fixing apparatus 102 respectively, or arranged on the main body apparatus 101 and the fixing apparatus 102 at the same time, or even the first display unit 104 may be arranged across the main body apparatus 101 and the fixing apparatus 102. The above various cases are all applied to the schematic diagrams of the first display unit 104 and the second display unit 105 described with reference to FIGS. 19A and 19B.

As shown in FIG. 19A, the first display unit 104 and the second display unit 105 may be partly overlapped with each other, however, the first viewable part 1041 in the first display unit 104 and the second viewable part 1051 in the second display unit 105 are not overlapped with each other. Further, as shown in FIG. 19B, the second viewable part 1051 of the second display unit 105 is overlapped with the flexible waveguide sub component 303 constructing the first display unit 104 in the display direction or the direction opposite to the display direction.

In this way, different from the case in which the first display unit 104 and the second display unit 105 are configured entirely independently without the flexible waveguide sub component 303, in the electronic device according to the seventh embodiment of the present disclosure shown in FIGS. 19A and 19B, since the flexible waveguide sub component 303 is configured, the first display unit 104 and the second display unit 105 may be partly integrated with each other. That is, the second viewable part 1051 of the second display unit 105 is overlapped with the non-display component such as the flexible waveguide sub component 303 in the first display unit 104, thereby achieving a more compact configuration of multiple display units of the electronic device without affecting the respective independent display functions of the different display units.

The structure and the functional configuration of the electronic device according to the embodiment of the present disclosure have been described above with reference to FIGS. 1-19. Next, the display method used by the electronic device will be described with reference to FIGS. 20-22.

Figure 20:
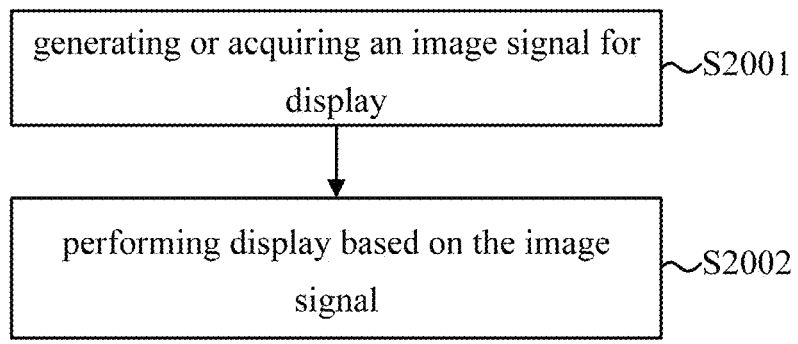
FIG. 20 is a flowchart showing a display method in the electronic device according to still another embodiment of the present disclosure.

FIG. 20 is a flowchart showing the display method according to an embodiment of the present disclosure. The display method shown in FIG. 20 is applied to the electronic device shown in FIG. 1. As described above, the electronic device includes a main body apparatus having a processing unit which generates a first image and performs display control; a fixing apparatus connected with the main body apparatus, having at least a fixed state in which the fixing apparatus can be at least a part of an annular space or an approximate annular space meeting a first predetermined condition, the annular space or the approximate annular space being capable of surrounding an outer side of a cylinder meeting a second predetermined condition; and a first display unit arranged on the main body apparatus or the fixing apparatus, which outputs the first image, wherein the first display unit comprises a first display component which displays the first image, and a first optical component which receives light corresponding to the first image emitted from the first display component, and changes the light path of the light corresponding to the first image to form a magnified virtual image corresponding to the first image, wherein the first display unit further includes a flexible waveguide sub component.

The display method includes generating or acquiring an image signal for display (step S2001); and performing display based on the image signal (step S2002).

In the step S2001, the processing unit 103 of the electronic device 100 may generate an image signal for display. Also, the electronic device 100 may acquire the image signal for display from the server or another electronic device through a communication unit. Then, the process goes to the step S2002.

In the step S2002, the display unit of the electronic device 100 performs displaying based on the image generated or acquired in the step S801. Particularly, as described above, the step of performing displaying may include displaying a magnified virtual image corresponding to the image signal through the display unit including the display component and the optical component. Also, the step of performing displaying may further include generating a control signal based on the signal acquired by the sensor to control the on/off of the display of the image signal, etc. Further, the step of performing displaying may further include displaying a magnified 3D virtual image corresponding to the image signal through two display units including the display component and the optical component.

Figure 21:
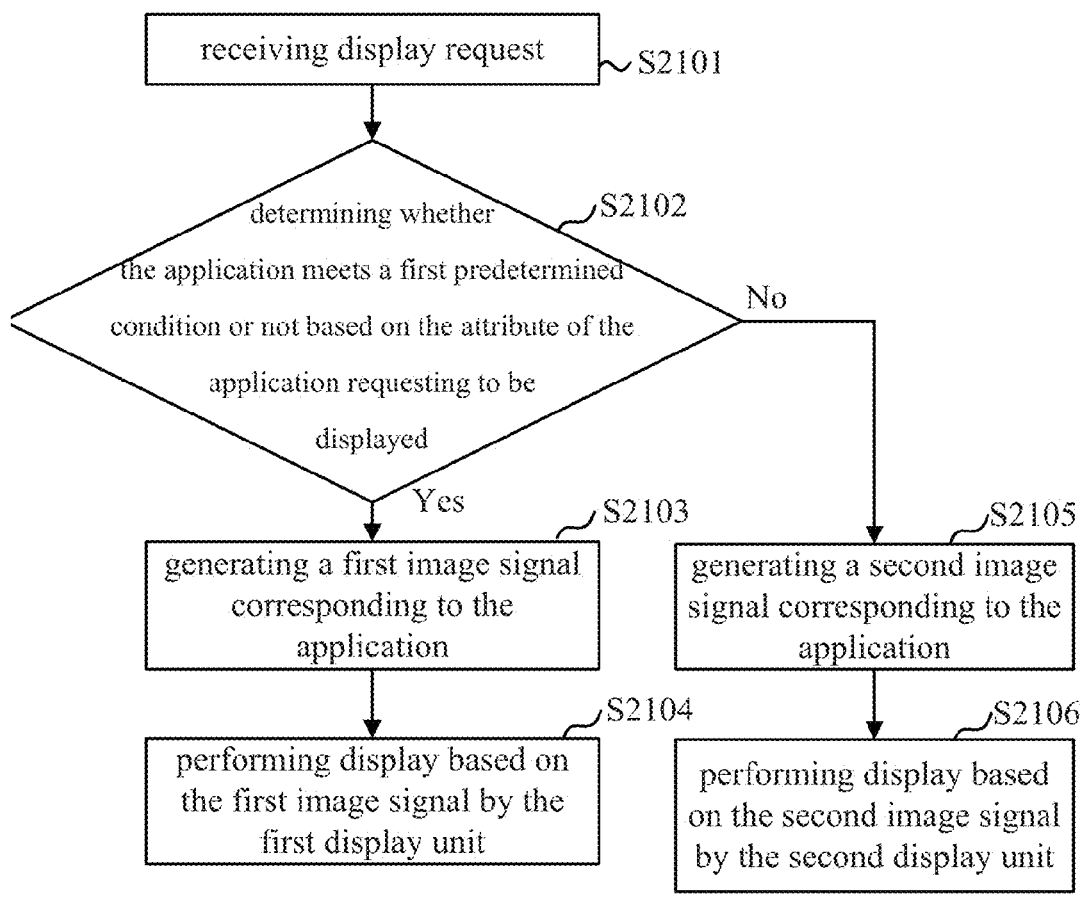
FIG. 21 is a first flowchart showing the display method in the electronic device according to a seventh embodiment of the present disclosure.
Figure 22:
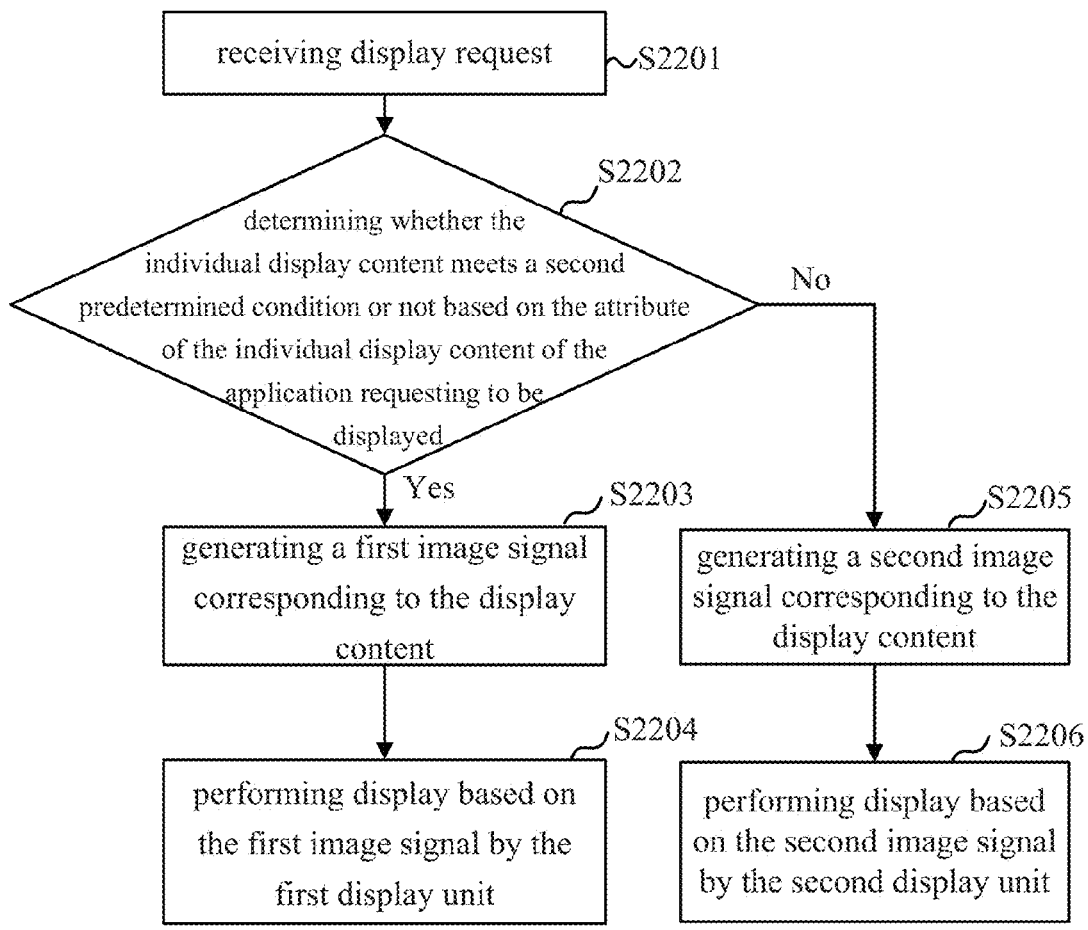
FIG. 22 is a second flowchart showing the display method in the electronic device according to a seventh embodiment of the present disclosure.

FIGS. 21 and 22 are first and second flowcharts showing the display method of the electronic device according to the seventh embodiment of the present disclosure. The electronic device according to the seventh embodiment of the present disclosure is configured with two display units of the first display unit 104 and the second display unit 105, wherein the first display unit 104 and the second display unit 105 are display units following different display principles. Therefore, when the processing unit 103 receives a display request, it may allocate to different display units to perform an optimized display based on the type of the requesting application and the type of content to be displayed.

As shown in FIG. 21, the first flowchart of the display method of the electronic device according to the seventh embodiment of the present disclosure includes the following steps.

At step S2101, the processing unit 103 receives the display request. Then, the flow goes to step S2102.

At the step S2102, the processing unit 103 determines whether an application requesting to be displayed meets a first predetermined condition or not based on an attribute of the application. Here, the first predetermined condition may be the optimum display size of the application requesting to be displayed being larger than or equal to a predetermined size, or the application requesting to be displayed belonging to a predetermined specified type, such as a video display application, an image display application or a GPS application etc.

If a positive result is obtained in the step S2102, i.e., if the application meets the first predetermined condition, the process goes to step S2103. In the step S2103, the processing unit 103 may generate the first image signal corresponding to the application. Then, the process goes to step S2104.

At the step S2104, the first display unit 104 performs display based on the first image signal.

On the contrary, if a negative result is obtained in the step S2102, i.e. if the application does not meet the first predetermined condition, the process goes to step S2105. In the step S2105, the processing unit 103 may generate a second image signal corresponding to the application. Then, the process goes to step S2106.

At the step S2106, the second display unit 105 performs display based on the second image signal.

For example, when the user starts the video display application, the processing unit 103 determines that the application meets the first predetermined condition, generates a video signal as the first image signal, and transmits the first image signal to the first display unit 104 for display. On the contrary, when the electronic device 100 receives a communication request from another electronic device and a communication application such as a voice communication application requests to be displayed, the processing unit 103 determines that the application does not meet the first predetermined condition, generates a signal such as the incoming number and the contact information as the second image signal, and transmits the second image signal to the second display unit 105 for display.

The flow of the display method shown in FIG. 21 is based on the processing unit determining and allocating the display unit for display according to different attributes of the application. However, the display method according to the embodiment of the present disclosure is not limited thereto, and the processing unit may determine and allocate the display unit for display according to different attributes of the content to be displayed in the application.

As shown in FIG. 22, the second flowchart of the display method of the electronic device according to the seventh embodiment of the present disclosure includes the following steps.

At step S2201, the processing unit 103 receives the display request. Then, the flow goes to step S2202.

At the step S2202, the processing unit 103 determines whether an individual display content of an application requesting to be displayed meets a second predetermined condition or not based on a type of the individual display content. Here, the second predetermined condition may be the optimum display size of the display content requesting to be displayed being larger than or equal to a predetermined size, or the display content requesting to be displayed belonging to a predetermined specified type.

If a positive result is obtained in the step S2202, i.e., if the display content meets the second predetermined condition, the process goes to step S2203. In the step S2203, the processing unit 103 may generate the first image signal corresponding to the display content. Then, the process goes to step S2204.

At the step S2204, the first display unit 104 performs display based on the first image signal.

On the contrary, if a negative result is obtained in the step S2202, i.e. if the display content does not meet the second predetermined condition, the process goes to step S2205. In the step S2205, the processing unit 103 may generate a second image signal for display corresponding to the display content. Then, the process goes to step S2206.

At the step S2206, the second display unit 105 performs display based on the second image signal.

For example, when the user uses a GPS application, the GPS application includes map content requiring a large size display and content such as turning prompt etc. which does not require a large size display. Therefore, the processing unit 103 will generate the first image signal for the map content, and transmits the first image signal to the first display unit 104 for display. Then, the processing unit 103 will generate the second image signal for content such as turning prompt etc., and transmit the second image signal to the second display unit 105 for display.

FIGS. 23A-23D are schematic diagrams showing the detailed configuration of the fixing apparatus in the electronic device according to an eighth embodiment of the present disclosure.

Figure 23A:
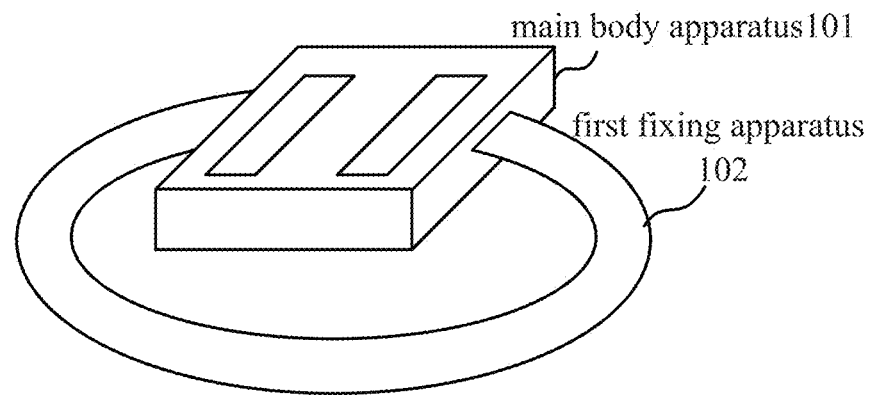
FIGS. 23A-23D are schematic diagrams showing a detailed configuration of a fixing apparatus in the electronic device according to an eighth embodiment of the present disclosure.

As shown in FIG. 23A, the first fixing apparatus 102 has at least a first fixed state in which the first fixing apparatus 102 can be at least a part of an annular space or an approximate annular space meeting a first predetermined condition, the annular space or the approximate annular space being capable of surrounding an outer side of a cylinder meeting a second predetermined condition.

Particularly, the first fixing apparatus 102 and the main body apparatus 101 form a closed-loop annular space, wherein the first fixing apparatus 102 and the main body apparatus 101 form a part of the annular space, respectively. Alternatively, the first fixing apparatus 102 and the main body apparatus 101 form an approximate annular space with a small opening, wherein the first fixing apparatus 902 and the main body apparatus 101 form a part of the approximate annular space, respectively. Alternatively, the annular space or the approximate annular space may be formed by the first fixing apparatus 102 alone. In an embodiment of the present disclosure, the main body apparatus 101 is a dial section of the smart watch, and the first fixing apparatus 102 is a watchband section of the smart watch. The annular space or the approximate annular space formed by the main body apparatus 101 and the first fixing apparatus 102 can surround a wrist of a user of the smart watch as the cylinder. In the case of the approximate annular space, a first predetermined condition that the gap of the annular cycle of the annular space be smaller than the diameter of the cylinder to be surrounded should be met. Also, a second predetermined condition that the diameter of the annular space or the approximate annular space be larger than the diameter of the wrist of the user and smaller than the diameter of the first of the user should be met.

In order to realize the goal that the electronic device 100 can provide different wearing manners according to usage scenes and user requirements, the diameter of the annular space or the approximate annular space formed by the first fixing apparatus 102 shown in FIG. 23A is variable. Optionally, the difference between the maximum and the minimum of the diameter is larger than a predetermined threshold. For example, the first fixing apparatus 102 may fix the electronic device 100 at the user wrist, or fix the electronic device 100 at the user head when the user needs to watch for a long time or expects to watch without his/her hands occupied. When fixing the electronic device 100 at the user wrist, the diameter of the annular space or the approximate annular space should be about 10 cm. When fixing the electronic device 100 at the user head, the diameter of the annular space or the approximate annular space should be about 30 cm. The diameter of the annular space or the approximate annular space formed by the first fixing apparatus 102 has a maximum of about 30 cm and a minimum of about 10 cm. The difference between the maximum and the minimum is larger than the predetermined threshold. For example, the predetermined threshold may be 10 cm in minimum, and may optionally be 20 cm. Alternatively, the predetermined threshold may be that the maximum is twice of the minimum and optionally three times of the minimum. That is, the first fixing apparatus 102 may provide the user with an adaptive adjustment range large enough to meet different usage scenes.

Figure 23B:
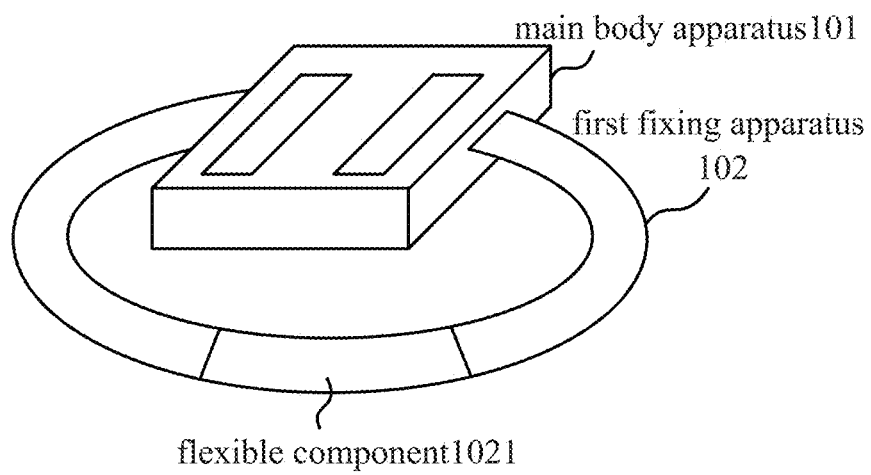
Figure 23C:
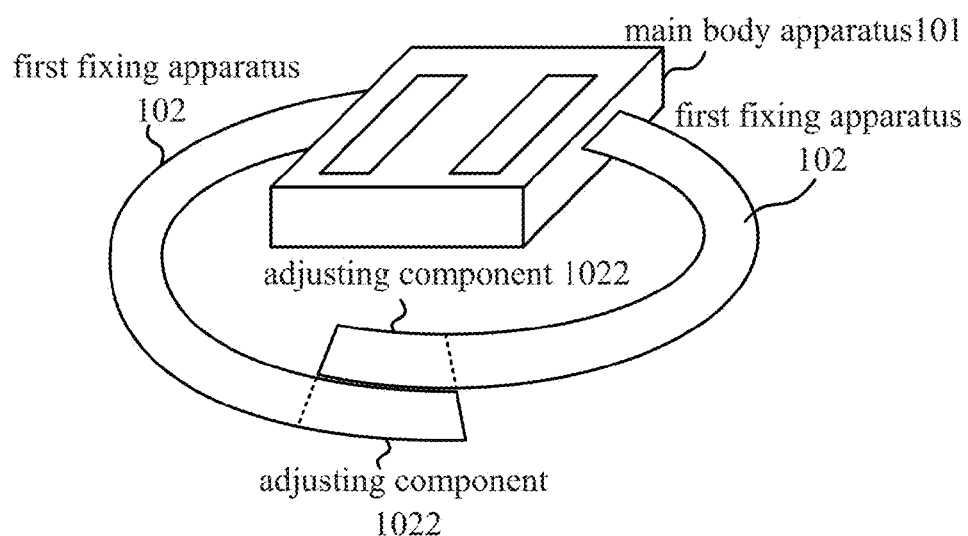
Figure 23D:
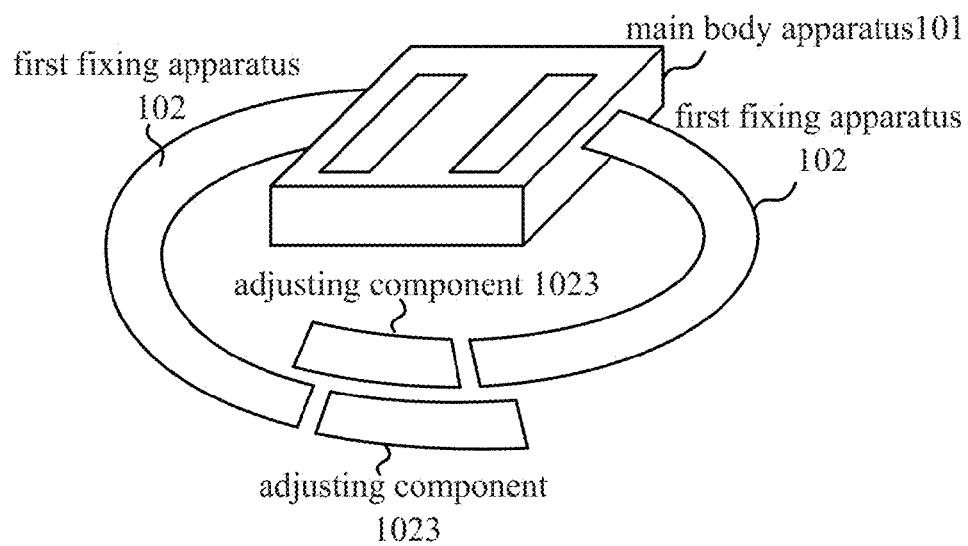

FIGS. 23B-23D illustrate several manners to realize the first fixing apparatus 102 having an adjustment range large enough in FIG. 23A.

As shown in FIG. 23B, the first fixing apparatus 102 includes at least one flexible unit 1021. The at least one flexible unit 1021 has a relaxed first state in which the diameter of the annular space or the approximate annular space is the maximum, and a tight second state in which the diameter of the annular space or the approximate annular space is the minimum.

More particularly, the at least one flexible unit 1021 may be formed by multiple discrete sub flexible units, or may be only one integrate flexible unit. In the case of multiple discrete sub flexible units, further, multiple discrete sub flexible units accommodating flexible space connected by a rotation shaft or multiple discrete sub flexible units accommodating non-flexible space connected flexibly are included.

As shown in FIGS. 23C and 23D, the first fixing apparatus 102 may further comprise an adjusting unit 1022 or an adjusting unit 1023, which controls the diameter of the annular space or the approximate annular space to change between the maximum and the minimum. In the case shown in FIG. 23C, the adjusting unit 1022 is a component such as a buckle of a strap, which realizes the control of the diameter of the annular space or the approximate annular space by controlling the length of the overlapped part in the first fixing apparatus 102. In an embodiment of the present disclosure, the adjusting unit 1022 may be a rigid component with a part the upper part of which may be overlapped with the lower part. When it is necessary to be fixed to a cylinder with a large diameter, the length of the overlapped part may be reduced smaller, even to a state in which it is entirely extended with no overlapped part, to form a diameter of a larger annular space or the approximate annular space. On the contrary, when it is necessary to be fixed to a cylinder with a small diameter, the length of the overlapped part may be increased larger, even to form a part with three or more layers overlapped, to form a diameter of a smaller annular space or the approximate annular space. When the adaptive adjustment has been done according to the cylinder to be fixed to, the adjusting unit 1022 may be fixed rigidly.

In the case shown in FIG. 23D, the adjusting unit 1023 is for example an extended component, which realizes the control of the diameter of the annular space or the approximate annular space by extending the length itself when necessary. In an embodiment of the present disclosure, the adjusting unit 1023 may include a cavity accommodated with an extendable component such as a roller. The extendable component such as the roller may be extended according to the diameter of the cylinder to be fixed to. When it is necessary to be fixed to a cylinder with a large diameter, parts wrapped around the roller may be pulled off, to form a diameter of a larger annular space or the approximate annular space. On the contrary, when it is necessary to be fixed to a cylinder with a small diameter, more part may be wrapped around the roller to form a diameter of a smaller annular space or the approximate annular space. Also, it is easy to be understood that the first fixing apparatus according to the embodiment of the present disclosure is not limited thereto, and may include an external extended component, which may be connected or disconnected according to the diameter of the cylinder to be fixed to.

Also, the manner of forming the annular space or the approximate annular space is not limited in the fixing apparatus according to the embodiment of the present disclosure. In an embodiment of the present disclosure, the main body apparatus 101 may be coupled to different fixing apparatuses through a connection unit to form different usage patterns to adapt to different wearing manners.

Figure 24A:
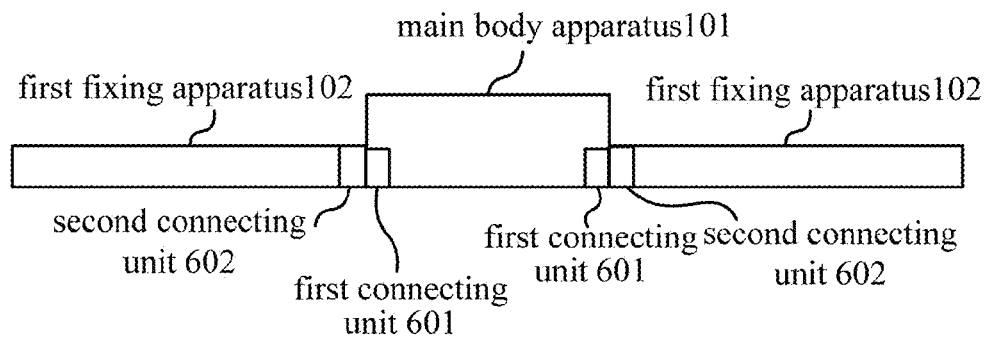
FIGS. 24A and 24B are schematic diagrams showing a detailed configuration of a fixing apparatus in the electronic device according to a ninth embodiment of the present disclosure.

As shown in FIG. 24A, the main body apparatus 101 includes a first connecting unit 601, the first fixing apparatus 102 includes a second connecting unit 602, with the main body apparatus 101 and the first fixing apparatus 102 connected with each other through the coupling between the first connecting unit 601 and the second connecting unit 602. As described above, the first connecting unit 601 and the second connecting unit 602 construct the connection apparatus 106. In an embodiment of the present disclosure, the main body apparatus 101 is a dial section of a smart watch, the first fixing apparatus 102 is a watchband section of the smart watch, and the first connecting unit 601 and the second connecting unit 602 are the riveting component of the dial and the watch band.

Figure 24B:
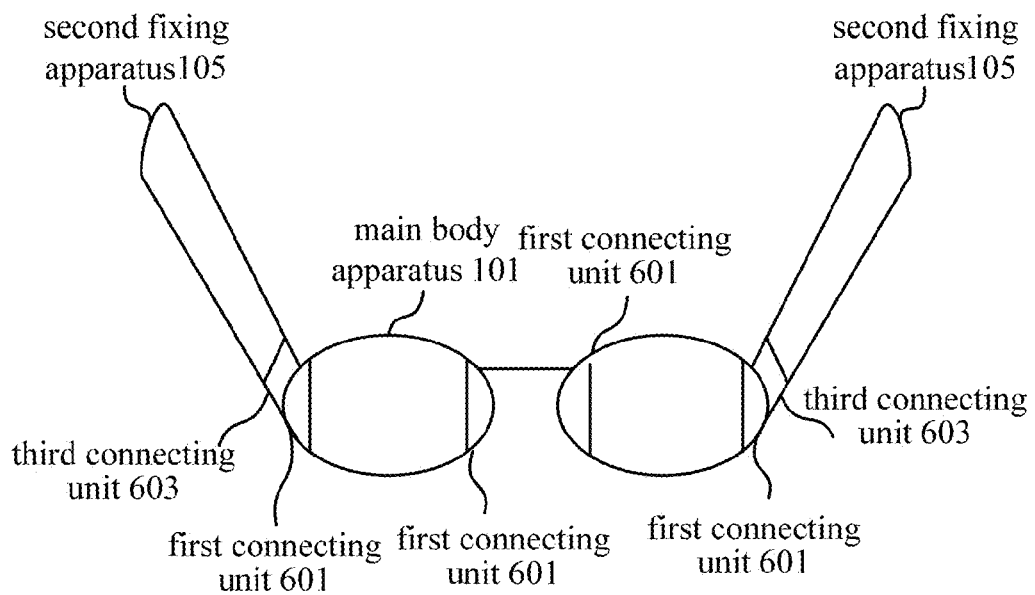

As shown in FIG. 24B, the electronic device 100 may have a usage state different from that shown in FIG. 24A. The main body apparatus 901 may be discoupled with the first fixing apparatus 102, but forms a second fixed state through a coupling by the first connecting unit 601 and a third connection unit 603 in the second fixing apparatus 105.

The main body apparatus 101 may include a first sub apparatus and a second sub apparatus which are connected with each other through a sub connection apparatus. The relative locations of the first sub apparatus and the second sub apparatus are changeable. Particularly, in the examples shown in FIGS. 24A and 24B, in an embodiment of the present disclosure, the main body apparatus 101 include the first sub apparatus and the second sub apparatus which may be turned over or slide horizontally. When the relative locations of the first sub apparatus and the second sub apparatus are changed (i.e., turned over or slide horizontally), it is switched from an overlapped state to a non-overlapped state. The two sides of the two sub apparatuses each are arranged with the first connecting unit 601. When it is necessary to be coupled with the second fixing apparatus 105, the main body apparatus 101 is extended. For example, it is extended from the dial-like look shown in FIG. 24A to a glass-like look shown in FIG. 24B. Accordingly, the second fixing apparatus 105 may be formed by two to three sub parts. For example, when the main body apparatus 101 is extended to be the whole front part of the smart glass, the second fixing apparatus 105 is the two support parts connecting at two sides of the smart glass (i.e., the temple and the nosepiece). Also, when the main body apparatus 101 is a part of the whole front part of the smart glass, the main body apparatus 101 may be fixed to the second fixing apparatus 905 as a piece of the glass or a part of a piece of the glass (e.g., embedded with the edges entirely corresponding with each other, or installed through the corresponding interface) (not shown in detail). In this case, the second fixing apparatus 105 is three support parts (i.e., the temple, the frame and the nosepiece) connecting at the two sides and the middle of the smart glass. In the second fixed state shown in FIG. 24B, the second fixing apparatus 105 is at least a part of an approximate rectangular space capable of surrounding an outer surface of an object meeting a third predetermined condition. Particularly, in the case where the object is the human head, the third predetermined condition is that there are extruded parts the number and location of which correspond to those of the second fixing apparatus 105 (i.e., the human ear and the nose). That is, in the approximate rectangular space surrounding the human head, the second fixing apparatus 105 has support parts corresponding to the extruded parts to be fixed to. For example, it has the temple at the two sides of the space and the nosepiece at the middle of the space to form the approximate rectangular space surrounding the human head.

As shown in FIGS. 24A and 24B, the electronic device 100 may be changed between the first fixed state and the second fixed state, thereby the electronic device 100 may be changed from a usage manner as the smart watch to a usage manner as the smart glass when it requires a long time watch or without the both hands occupied.

Figure 25:
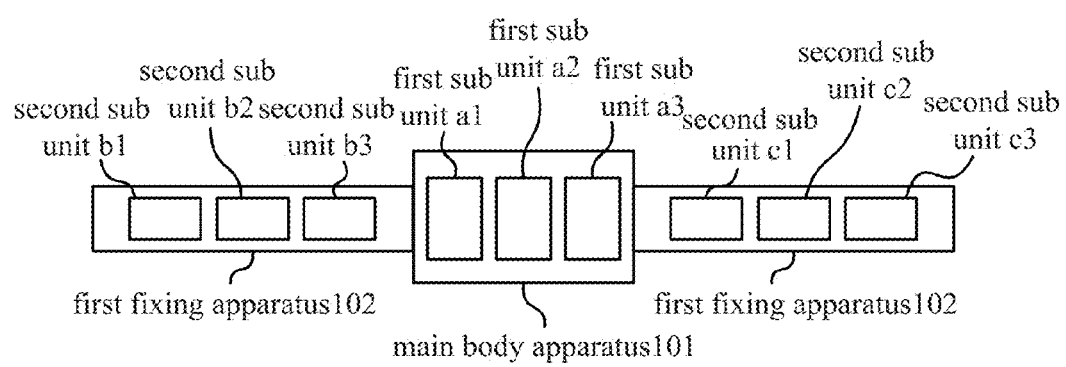
FIG. 25 is a structural diagram showing an electronic device according to a tenth embodiment of the present disclosure.

FIG. 25 is a structural diagram showing the electronic device according to a tenth embodiment of the present disclosure. As shown in FIG. 25, the electronic device according to the tenth embodiment of the present disclosure includes the main body apparatus 101 and the first fixing apparatus 102 as well. Particularly, the main body apparatus 101 includes at least one first sub unit (the first sub units a1-a3), the first fixing apparatus 102 includes at least one second sub unit (the second sub units b1-c3), and the at least one first sub unit and the at least one second sub unit form a data or electrical connection. The multiple first sub units in the main body apparatus 101 may be connected in parallel or serially with each other. Similarly, the multiple second sub units in the first fixing apparatus 102 may be connected in parallel or serially with each other. Also, the at least one sub unit may be connected to the first fixing apparatus 102 via the main body apparatus 101, and then form the data or electrical connection with the at least one second sub unit. Further, the at least one first sub unit may form the data or electrical connection with the at least one second sub unit directly. The first sub unit and the second sub unit may be the display unit, the touch sensitive unit, the sensing unit, the circuit unit, the battery unit, the communication unit, the location unit or the image acquiring unit and so on. The at least one second sub unit is connected to the first fixing apparatus 102 through a dismountable connection interface. Particularly, the multiple second sub units may be mounted inside of the cavity of the first fixing apparatus 102 via a single interface. Alternatively, the multiple second sub units may be mounted inside of the cavity of the first fixing apparatus 102 via multiple interfaces with a one-to-one correspondence. Also, the second sub unit may be mounted and fixed to the outer surface of the first fixing apparatus 102 through an external interface.

Particularly, when the main body apparatus 101 and the first fixing apparatus 102 are discoupled, the functions required by the user currently can be realized through the individual sub units in the main body apparatus 101, so that the power consumption of the electronic device 100 is the lowest and the weight is reduced to the minimum. That is, the first sub unit included in the main body apparatus is capable of supporting work of the electronic device. For example, when the main body apparatus 101 includes the processing unit 103, the first display unit 104 and a necessary battery unit (not shown), the main body apparatus 101 can perform the display function of the electronic device 100. Also, when it is configured with the storage unit or the communication unit, the main body apparatus 101 can perform data storage function and communication function correspondingly, without being coupled with the first fixing apparatus 102.

The one or more of the at least one first sub unit and one or more of the at least one second sub unit may be sub units of different types. In this way, functional configurations adaptively for different usage scenes can be realized by different combinations of the first sub units and the second sub units.

Also, the one or more of the at least one first sub unit and one or more of the at least one second sub unit may be sub units of the same type. Normally, the performance of the first sub unit is lower than that of the second sub unit of the same type. For example, the battery capacity of the first sub unit as a battery unit is lower than that of the second sub unit as the battery unit. The communication distance and communication rate of the first sub unit as a communication unit is lower than those of the second sub unit as the communication unit. More particularly, the sum of the battery capacities of the second sub units as the battery unit in the first fixing apparatus 102 is larger than the battery unit of the first sub unit as the battery unit. Alternatively, the battery capacity of each second sub unit as the battery unit in the first fixing apparatus 102 is larger than the battery capacity of the first sub unit as the battery unit. In this way, the user may configure the individual sub units required to be mounted freely according to the actual requirement. For example, when the user is in a case in which long endurance is required such as travelling, the second sub unit with a higher battery capacity may be configured in the first fixing apparatus 102. When the user is in a case in which light weight is required such as sporting, the unnecessary second sub unit in the first fixing apparatus 102 may be removed, and the power is supplied only by the first sub unit as the battery unit in the main body apparatus 101. Also, when the main body apparatus 101 is configured with a first sub unit having the near distance communication capability, the electronic device 100 may establish a data connection based on for example Bluetooth with another independent electronic device such as a smart phone, so as to extend the function of the independent electronic device, for example, extend the display (in the navigation scenario, displaying the navigation prompt information) or extend the prompt function (in the incoming call scenario, displaying the identification information of the incoming call). When the first fixing apparatus 102 is configured with a second sub unit having a long distance communication capability (for example, the mobile communication network data communication capability or the WLAN data communication capability), the work of the above first sub unit (the near distance communication capable unit) may be paused. The electronic device 100 may become an independent electronic device substituting for example the smart phone, especially for the second sub unit having a mobile communication network (3G, 4G and so on) data communication capability. Of course, if the coverage of the WLAN is wide enough, the same effect can be achieved. That is, the user may configure sub units with different communication capabilities properly according to the usage scene and the requirement. For example, in a case where it is convenient for the user to carry the smart phone, the near distance communication unit in the main body apparatus 101 may be used alone, so that the electronic device 100 in the embodiment of the present disclosure may be used as an attachment of the smart phone. In a case where it is not convenient for the user to carry the smart phone, for example, in a sport, the long distance communication unit may be used, with the electronic device 100 in the embodiment of the present disclosure as a device having an independent communication function.

Also, the first sub unit and the second sub unit in the main body apparatus 101 and the first fixing apparatus 102 may be configured taking the gravity center distribution of the electronic device itself into consideration, so that the weight of the electronic device is distributed evenly to provide a more comfortable wearing experience. Particularly, the cavity or the external interface for mounting the first sub unit and the second sub unit in the main body apparatus 101 and the first fixing apparatus 102 may be distributed symmetrically. For example, in the electronic device 100 in the state of for example the smart watch or the smart glass, the first fixing apparatus 102 arranged at the two sides of the main body apparatus 101 has the same number of the cavity or the external interface. Also, the sub unit mounted to the cavity or the external interface may be configured with the uniform specification. For example, they have the same size, and have almost the same weight (the difference between the weights of the individual sub units may be designed to be smaller than a predetermined weight threshold, such as 20 gram).

The electronic device and display method according to the embodiment of the present disclosure have been described above with reference to FIGS. 1-25. The electronic device and the display method according to the embodiments of the present disclosure are not limited by the size of the wearable electronic device such as the smart watch itself, and the image or video display with a larger size and a higher definition is provided. Also, the power consumption of the electronic device is relatively low compared to the micro projector for displaying a large image, the electronic device is not limited by the usage scene and well usage privacy is provided. Moreover, it can provide more flexible component configuration manners, so as to adapt to particular designs for different usage patterns. Further, it can provide multiple wearing manners, a free combination and a switch between multiple functional modules adaptively, according to the different usage scenes, user requirements and content to be displayed. The electronic device and the display method according to the embodiments of the present disclosure greatly improve user experience of the wearable electronic device.

It is to be noted that in the present description, the term of "comprising", "including" or the like does not intend to cover an inclusion exclusively, and a process, a method, an article or a device comprising a series of elements does not only include those elements, but also include other elements not listed explicitly, or include elements that art intrinsic to the process, the method, the article or the device. Without other limitations, the element defined by the term "comprising a" does not exclude to include other same element in the process, the method, the article or the device comprising the element.

Finally, it is to be noted that the above series of process does not include the process performed in a time order as described herein, but also include processes performed in parallel or separately, instead of in the time order.

With the description of the implementations above, those skilled in the art may understand that the technology in the embodiments of the present disclosure may be realized by software in combination with necessary general hardware platform, or entirely by hardware. Based on such understanding, the technical solution, or at least the part which contribute to the prior art, in the embodiment of the present disclosure, in essence, may be realized by software product, which may be stored in a storage medium such as a ROM/RAM, a magnetic diskette, an optical disk, etc., and include several instructions which may cause a computer device, such as a PC, a server or a network device etc., to perform the method according to the embodiments, or at least certain parts of the embodiments of the present disclosure.

The implementations of the present disclosure have been described above in detail. The principle and the implementations of the present disclosure are described by way of example. The description of the above embodiments is only to help the understanding of the method and the core of the present disclosure. To those skilled in the art, alternations may occur in terms of the implementation or the application range based on the idea of the present disclosure. In summary, the content of the specification does not be construed to limit the present disclosure thereto.

The invention claimed is:

1. An electronic device, comprising: a main body apparatus comprising a processing unit which generates a first image and performs display control; a fixing apparatus connected with the main body apparatus, which maintains a relative location relationship between the electronic device and at least a part of body of a user; a first display unit arranged on the main body apparatus and/or the fixing apparatus, which outputs a first image and a second display unit which outputs a second image; wherein the first display unit comprises a first display component which displays the first image, and a first optical component which receives light corresponding to the first image emitted from the first display component, and changes the light path of the light corresponding to the first image to form a magnified virtual image corresponding to the first image, a first viewable part of the first display unit and a second viewable part of the second display unit have a first state in which they are arranged on the fixing apparatus or the main body apparatus overlapped with each other, and when the first viewable part and the second viewable part are overlapped with each other, the transmittance of the viewable part at the outer side of an annular space or an approximate annular space in the first viewable part and the second viewable part is larger than or equal to a predetermined value in an outward direction of the annular space or the approximate annular space, so that a display function of the viewable part at the inner side of the annular space or the approximate annular space in the first viewable part and the second viewable part is not affected by the viewable part at the outer side of the annular space or the approximate annular space in the first viewable part and the second viewable part.

2. The electronic device according to claim 1, wherein the fixing apparatus has at least a fixed state in which the fixing apparatus can be at least a part of the annular space or the approximate annular space meeting a first predetermined condition, the annular space or the approximate annular space being capable of surrounding an outer side of a cylinder meeting a second predetermined condition.

3. The electronic device according to claim 2, wherein at least a part of the first optical component is a component the transmittance of which meets a predetermined condition in an outward direction of the annular space or the approximate annular space.

4. The electronic device according to claim 3, wherein the transmittance of the electronic device meets the predetermined condition in the outward direction of the annular space or the approximate annular space corresponding to the at least a part of the first optical component.

5. The electronic device according to claim 2, further comprising a second display unit the type of which is different from that of the first display unit, wherein one of the first display unit and the second display unit is arranged on the main body apparatus, the other of which is arranged on the fixing apparatus, and the display direction of the second display unit is the outward direction of the annular space or the approximate annular space.

6. The electronic device according to claim 5, wherein the first display unit is arranged on the main body apparatus and the second display unit is arranged on the fixing apparatus; or the second display unit is arranged on the main body apparatus and the first display unit is arranged on the fixing apparatus.

7. The electronic device according to claim 5, further comprising a third display unit arranged on the main body apparatus or the fixing apparatus together with the first display unit, which outputs a third image, wherein the third display unit comprises a second display component configured to display the third image, and a second optical component configured to receive light corresponding to the third image emitted from the second display component and changing the light path of the light corresponding to the third image to form a magnified virtual image corresponding to the third image.

8. The electronic device according to claim 1, wherein, a first viewable part of the first display unit and a second viewable part of the second display unit are arranged on the main body apparatus; or the first viewable part and the second viewable part are arranged on the fixing apparatus; or one of the first viewable part and the second viewable part is arranged on the main body apparatus and the other one of the first viewable part and the second viewable part is arranged on the fixing apparatus;

the viewable part is a part in the display unit which is viewed by the user so that the user is aware of the display content, the first display unit and the second display unit are display units following different display principles, and at least a part of the first optical component is the first viewable part.

9. The electronic device according to claim 8, wherein the first display unit and the second display unit display at the same time or display respectively, under the control of the processing unit.

10. The electronic device according to claim 2, wherein the first viewable part and the second viewable part have a second state in which they are arranged on the fixing apparatus or the main body apparatus adjacently with each other.

11. The electronic device according to claim 10, wherein the first viewable part is at the outer side; or the display direction of the first viewable part and the second viewable part is the outward direction of the annular space or the approximate annular space; or the display direction of one of the first viewable part and the second viewable part is the outward direction of the annular space or the approximate annular space, and the display direction of the other one of the first viewable part and the second viewable part is a direction vertical to the outward direction of the annular space or the approximate annular space.

12. The electronic device according to claim 10, wherein the main body apparatus further comprises a first sub unit and a second sub unit, one of the first viewable part and the second viewable part is arranged on the first sub unit, the other one of the first viewable part and the second viewable part is arranged on the second sub unit, and the first sub unit and the second sub unit are connected via a connecting unit, so that the first viewable part and the second viewable part are switched between the first state and a third state in which they are not arranged overlapped with each other; and the first sub unit is capable of sliding or rotating with respect to the second sub unit via the connecting unit.

13. The electronic device according to claim 2, wherein the first display unit further comprises a flexible waveguide sub component;

the electronic device further comprises a connection apparatus through which the main body apparatus and the fixing apparatus are connected and are capable of moving with respect to each other;

the first display unit is arranged on the main body apparatus and the fixing apparatus, the flexible waveguide sub component is arranged correspondingly to the connection apparatus, so that the flexible waveguide sub component can be used to guild and transfer light when the main body apparatus and the fixing apparatus are at different relative locations.

14. The electronic device according to claim 13, wherein the flexible waveguide sub component is arranged between the first display component and the first optical component, and is used to guild the light corresponding to the first image to the first optical component.

15. The electronic device according to claim 13, wherein the flexible waveguide sub component is arranged in the first display component or the first optical component.

16. The electronic device according to claim 13, wherein the flexible waveguide sub component arranged in the first display component is used to guild light before the first image is formed, the flexible waveguide sub component arranged between the first display component and the first optical component or arranged in the first optical component is used to guild the light corresponding to the first image after the first image is formed.

17. The electronic device according to claim 15, wherein the first display component comprise a light source sub component configured to emit imaging illumination light and a micro display sub component configured to display the first image, and the flexible waveguide sub component is arranged between the light source sub component and the micro display sub component, to guild the light emitted by the light source sub component to the micro display sub component; or the first optical component comprises a receiving sub component configured to receive the light corresponding to the first image and an imaging sub component configured to form the magnified virtual image corresponding to the first image, and the flexible waveguide sub component is arranged between the receiving sub component and the imaging sub component, to guild the light corresponding to the first image to the imaging sub component.

* * * * *